(12) United States Patent
Anima et al.

(10) Patent No.: US 9,355,415 B2
(45) Date of Patent: May 31, 2016

(54) PROVIDING CONTENT RECOMMENDATION TO USERS ON A SITE

(71) Applicant: Google Inc., Mountain View, CA (US)

(72) Inventors: Mario Ventura Anima, Sunnyvale, CA (US); Ralph Jacob Cressman, San Francisco, CA (US); Mikhail Dhruv, Palo Alto, CA (US); Kevin Ferguson, San Francisco, CA (US); Umanka Hebbar Karkada, Mountain View, CA (US); Jeremy Lazarus, San Francisco, CA (US); Benson Luk, San Francisco, CA (US)

(73) Assignee: Google Inc., Mountain View ( * ) Notice: Subject to any disclaimer, the term of this patent is extended or adjusted under 35 U.S.C. 154(b) by 221 days.

(21) Appl. No.: 14/070,655

(22) Filed: Nov. 4, 2013

(65) Prior Publication Data
US 2014/0136528 A1 May 15, 2014

Related U.S. Application Data

(60) Provisional application No. 61/725,410, filed on Nov. 12, 2012.

(51) Int. Cl.
*G06F 17/30* (2006.01)
*G06Q 30/02* (2012.01)

(52) U.S. Cl.
CPC ...... *G06Q 30/0282* (2013.01); *G06F 17/30864* (2013.01)

(58) Field of Classification Search
USPC .................. 707/722–723, 748, 754
See application file for complete search history.

(56) References Cited

U.S. PATENT DOCUMENTS

| | | | |
|---|---|---|---|
| 7,260,573 B1 * | 8/2007 | Jeh et al. | 707/708 |
| 7,761,423 B1 | 7/2010 | Cohen | |
| 8,447,760 B1 * | 5/2013 | Tong et al. | 707/728 |
| 8,645,300 B1 * | 2/2014 | Cowdrey et al. | 706/46 |
| 8,745,083 B1 * | 6/2014 | Ruiz | 707/770 |
| 8,977,617 B1 * | 3/2015 | Wu et al. | 707/736 |
| 9,098,551 B1 * | 8/2015 | Fryz et al. | |
| 2002/0065802 A1 * | 5/2002 | Uchiyama | 707/1 |

(Continued)

FOREIGN PATENT DOCUMENTS

JP  2012-058913  3/2012

OTHER PUBLICATIONS

International Search Report and Written Opinion for PCT/US2013/069308, mailed on Jan. 15, 2015, 10 pages.

*Primary Examiner* — Hanh Thai
(74) *Attorney, Agent, or Firm* — Patent Law Works LLP

(57) ABSTRACT

The disclosure includes a system and method for providing content recommendation to users on a site. The system includes a processor and a memory storing instructions that, when executed, cause the system to: receive data describing a page on a site visited by a first user; query one or more sources to retrieve one or more candidate items for the first user; determine one or more source types related to the one or more candidate items; determine one or more scores for the one or more candidate items based on an interest profile and the one or more source types; rank the one or more candidate items; determine that an invitation trigger event causing a presentation of an invitation state occurs; determine that a recommendation trigger event causing a presentation of a recommendation state occurs during the invitation state; and provide a recommendation state to the first user.

20 Claims, 20 Drawing Sheets

(56) References Cited

U.S. PATENT DOCUMENTS

| | | | |
|---|---|---|---|
| 2006/0080084 A1* | 4/2006 | Shuster | 704/9 |
| 2006/0253584 A1* | 11/2006 | Dixon et al. | 709/225 |
| 2008/0313130 A1* | 12/2008 | Hammond et al. | 707/2 |
| 2009/0006374 A1 | 1/2009 | Kim et al. | |
| 2009/0132373 A1* | 5/2009 | Redlich | G06Q 30/02 705/14.39 |
| 2009/0177745 A1* | 7/2009 | Davis et al. | 709/204 |
| 2009/0259646 A1* | 10/2009 | Fujita et al. | 707/5 |
| 2009/0280792 A1* | 11/2009 | Leblanc et al. | 455/418 |
| 2009/0327057 A1* | 12/2009 | Redlich | G06Q 30/02 705/14.2 |
| 2010/0010987 A1* | 1/2010 | Smyth et al. | 707/5 |
| 2010/0041482 A1* | 2/2010 | Kumar et al. | 463/42 |
| 2010/0131482 A1* | 5/2010 | Linthicum et al. | 707/706 |
| 2010/0144426 A1* | 6/2010 | Winner et al. | 463/25 |
| 2010/0169153 A1 | 7/2010 | Hwacinski et al. | |
| 2010/0205541 A1* | 8/2010 | Rapaport et al. | 715/753 |
| 2010/0287048 A1* | 11/2010 | Ramer et al. | 705/14.46 |
| 2010/0332488 A1* | 12/2010 | Horvitz et al. | 707/759 |
| 2011/0213655 A1* | 9/2011 | Henkin et al. | 705/14.49 |
| 2011/0282759 A1* | 11/2011 | Levin et al. | 705/26.41 |
| 2011/0283320 A1* | 11/2011 | Levin et al. | 725/40 |
| 2012/0059811 A1 | 3/2012 | Libin et al. | |
| 2012/0117017 A1* | 5/2012 | Phillips et al. | 706/50 |
| 2012/0271805 A1* | 10/2012 | Holenstein et al. | 707/706 |
| 2013/0036344 A1* | 2/2013 | Ahmed et al. | 715/205 |
| 2013/0097093 A1* | 4/2013 | Kolber et al. | 705/321 |
| 2013/0132364 A1* | 5/2013 | Udupa et al. | 707/709 |
| 2013/0165234 A1* | 6/2013 | Hall et al. | 463/42 |
| 2013/0173523 A1* | 7/2013 | Sanchez et al. | 706/50 |
| 2013/0218866 A1* | 8/2013 | Qian et al. | 707/714 |
| 2014/0067944 A1* | 3/2014 | Jackson et al. | 709/204 |
| 2014/0067967 A1* | 3/2014 | Jackson et al. | 709/206 |

* cited by examiner

PROVIDING CONTENT RECOMMENDATION TO USERS ON A SITE

CROSS REFERENCE TO RELATED APPLICATIONS

This application claims priority under 35 USC §119(e) to U.S. Application No. 61/725,410, entitled "Providing Content Recommendation to Users on a Site" filed Nov. 12, 2012, the entirety of which is herein incorporated by reference.

BACKGROUND

The specification relates to providing content recommendation to users.

Mobile web browsing has grown tremendously. People use their mobile devices to perform various activities including, but not limited to, visiting online social networks, browsing web pages, viewing videos and/or listening to online music, etc. Mobile users usually visit a web page on a third-party site by clicking on a link posted in an application or service installed on their mobile devices. For example, a mobile user visits a web page on a third-party site by clicking on a link posted on a social feed in a social network. After consuming the single web page on the third-party site, the mobile users usually bounce back to the application or service that originally provides the link to them. This phenomenon can be referred to as a side-door problem for third-party sites. The high bounce rates on third-party sites are undesirable for third-party publishers.

SUMMARY

According to one innovative aspect of the subject matter described in this disclosure, a system for providing content recommendation to users on a site includes a processor and a memory storing instructions that, when executed, cause the system to: receive data describing a page on a site visited by a first user; query one or more sources to retrieve one or more candidate items from the site for the first user; determine one or more source types related to the one or more candidate items; determine one or more scores for the one or more candidate items based on an interest profile associated with the first user and the one or more source types; rank the one or more candidate items; determine that an invitation trigger event causing a presentation of an invitation state occurs; provide the invitation state to the first user; determine that a recommendation trigger event causing a presentation of a recommendation state occurs during the presentation of the invitation state; and provide the recommendation state to the first user, the recommendation state including one or more of the ranked candidate items.

In general, another innovative aspect of the subject matter described in this disclosure may be embodied in methods that include: receiving data describing a page on a site visited by a first user; querying one or more sources to retrieve one or more candidate items from the site for the first user; determining one or more source types related to the one or more candidate items; determining one or more scores for the one or more candidate items based on an interest profile associated with the first user and the one or more source types; ranking the one or more candidate items; determining that an invitation trigger event causing a presentation of an invitation state occurs; providing the invitation state to the first user; determining that a recommendation trigger event causing a presentation of a recommendation event occurs during the presentation of the invitation state; and providing the recommendation state to the first user, the recommendation state including one or more of the ranked candidate items.

Other aspects include corresponding methods, systems, apparatus, and computer program products for these and other innovative aspects.

These and other implementations may each optionally include one or more of the following features. For instance, the features include: the one or more sources including one or more of a social source, an authorship source, a relevant source and a popular source; querying a social source to retrieve a social item that has a user activity performed by a second user who is connected to the first user in a social graph, the social item from the same site as the page and being included in the one or more candidate items; content in the page being provided by an author, querying an authorship source to retrieve an authorship item that is provided by the same author, the authorship item from the same site as the page and being included in the one or more candidate items; querying a relevant source to retrieve a relevant item, the relevant item from the same site as the page and being included in the one or more candidate items; determining one or more topics related to the page; cross-referencing the one or more topics with the interest profile of the first user to obtain a matching topic; generating a query that includes an address of the page and the matching topic; sending the query to the relevant source; receiving a set of relevant items related to the matching topic from the relevant source; determining a recurring topic from the set of relevant items; determining the relevant item as one related to the recurring topic from the set of relevant items; and the recommendation state including one or more action cards for performing one or more engagement actions associated with the one or more of the ranked candidate items.

The specification may be particularly advantageous in a number of respects. First, the system provides recommended content to users that visit a page on a site. The recommended content includes candidate items from the same site, facilitating the users to discover a variety of topics on the site and to be more engaged on the site. Second, the recommended content may increase page views per visit for a site and therefore reduce bounce rates for the site. Third, the recommended content can be personalized for the users based on one or more of interest profiles of the users, content on the page and connections in a social graph. Fourth, the recommended content can be optimized for mobile web browsing.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
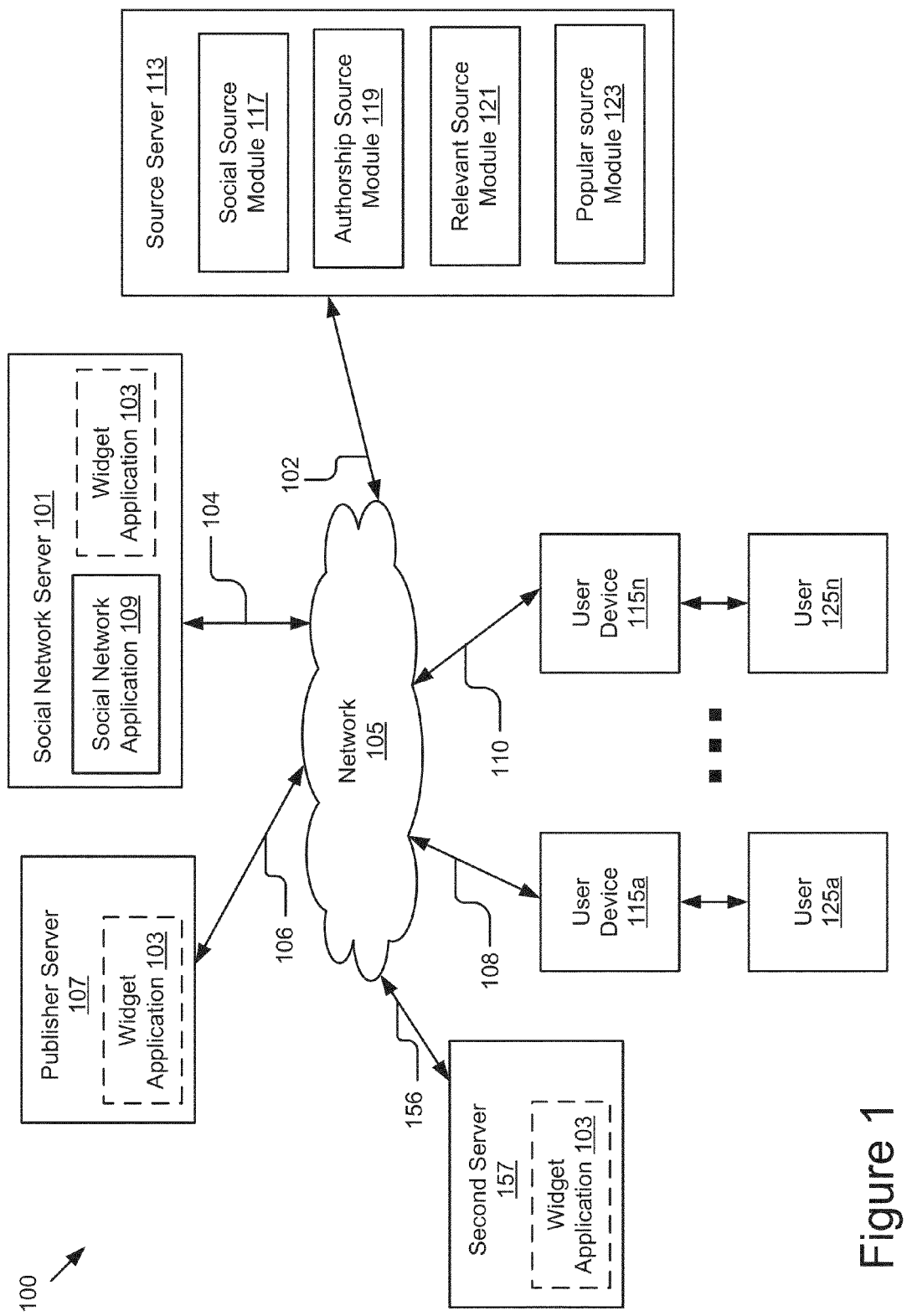
FIG. 1 is a block diagram illustrating an example system for providing content recommendation to users on a site.

FIG. 1 illustrates a block diagram of some implementations of a system 100 for providing content recommendation to users on a site. A site can be, for example, a publisher website or a third-party website. The illustrated system 100 includes user devices 115a ... 115n that can be accessed by users 125a ... 125n, a social network server 101, a publisher server 107, a source server 113 and a second server 157. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number. In the illustrated implementation, these entities of the system 100 are communicatively coupled via a network 105.

The user devices 115a, 115n in FIG. 1 are used by way of example. While FIG. 1 illustrates two user devices 115a and 115n, the present disclosure applies to a system architecture having one or more user devices 115. Furthermore, although FIG. 1 illustrates one network 105 coupled to the user devices 115, the social network server 101, the publisher server 107, the source server 113 and the second server 157, in practice one or more networks 105 can be connected to these entities.

In some implementations, the widget application 103 may be operable on the publisher server 107, which is coupled to the network 105 via signal line 106. In some implementations, the publisher server 107 can be a hardware server that includes a processor, a memory and network communication capabilities. The publisher server 107 sends and receives data to and from other entities of the system 100 via the network 105. While FIG. 1 includes one publisher server 107, the system 100 may include one or more publisher servers 107. In some implementations, the publisher server 107 publishes content on a site and provides the content to users who visit the site.

In some implementations, the widget application 103 may be stored on a second server 157, which is connected to the network 105 via signal line 156. In some implementations, the second server 157 can be a hardware server that includes a processor, a memory and network communication capabilities. The second server 157 sends and receives data to and from other entities of the system 100 via the network 105. While FIG. 1 includes one second server 157, the system 100 may include one or more second servers 157. In some implementations, the second server 157 publishes content on a site and provides the content to users who visit the site.

The widget application 103 can be code and routines for providing content recommendation to users on a site. In some implementations, the widget application 103 can be implemented using hardware including a field-programmable gate array (FPGA) or an application-specific integrated circuit (ASIC). In some other implementations, the widget application 103 can be implemented using a combination of hardware and software. In some implementations, the widget application 103 may be stored in a combination of the devices and servers, or in one of the devices or servers. The widget application 103 is described below in more detail with reference to FIGS. 2-8.

In some implementations, the widget application 103 may be operable on the social network server 101, which is coupled to the network 105 via signal line 104. The social network server 101 can be a hardware server that includes a processor, a memory and network communication capabilities. In some implementations, the social network server 101 sends and receives data to and from one or more of the user devices 115a, 115n, the source server 113, the publisher server 107 and the second server 157 via the network 105. The social network server 101 includes a social network application 109. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus.

The source server 113 can be a hardware server that includes a processor, a memory and network communication capabilities. The source server 113 sends and receives data to and from other entities of the system 100 via the network 105. While FIG. 1 includes one source server 113, the system 100 may include one or more source servers 113. In some implementations, the source server 113 receives a query from the widget application 103 and retrieves candidate items matching the query from a storage device (not pictured). The source server 113 sends the matching candidate items to the widget application 103. Examples of a candidate item include, but are not limited to, an article, a page (e.g., a Uniform Resource Locator (URL) of a page, an image of the page, a hyperlink to the page, etc.), an image, a video, a multi-user communication session, a location check-in, a post, a comment, an endorsement and a share with other users, etc. In the illustrated implementation, the source server 113 includes a social source module 117, an authorship source module 119, a relevant source module 121 and a popular source module 123.

The social source module 117 can be code and routines for providing social items from a social source. A social source can be a data source that provides one or more social items related to a user to the widget application 103. A social item related to a first user can be a candidate item that has one or more user activities performed by a second user who can be socially connected to the first user in a social graph. For example, a social item can be a candidate item on a site that a friend in a social graph has commented on, endorsed, shared and/or recommended. In another example, a social item can be a post, a comment, an endorsement, a share, a share with comments or a recommendation on a site performed by a friend in a social graph. Other examples of social items are possible.

In some implementations, a share and/or a share with comments can be public user activities. In some other implementations, a share and/or a share with comments can be private user activities with user consent to share with other users connected in a social graph. For example, the private shares from a second user connected to a first user in a social graph may be considered as social items for the first user if the second user has authorized to share the activities with the first user. If the second user does not authorize to share the activities with the first user, the private activities may not be considered as social items for the first user.

In some implementations, the social source module 117 receives a query from the widget application 103. The query includes data describing an address of a page that a user may be currently visiting (e.g., a URL) and identification data that identifies the user (e.g., a user identifier in a social network). The social source module 117 determines a domain or a site that hosts the page using the address of the page. The social source module 117 cooperates with the social network application 109 to determine one or more social items for the user that have been published on the same domain or the same site. In some implementations, the one or more social items can be candidate items from different domains or different sites. The social source module 117 sends the one or more social items for the user to the widget application 103 via the network 105.

The authorship source module 119 can be code and routines for providing authorship items from an authorship source. An authorship source can be a data source that provides one or more authorship items to the widget application 103. An authorship item can be a candidate item that has the same authorship as content on a page visited by a user. For example, if a user visits a page with content on the page provided by an author, an authorship item can be a candidate item published on the same site and provided by the same author as the content on the page. In another example, an authorship item can be a candidate item that the same author has provided on the same site and shared on a social network. In yet another example, an authorship item can be a candidate item provided by the same author and published on a different site. Other examples of authorship items are possible.

In some implementations, the authorship source module 119 generates an authorship annotation for each candidate item. An authorship annotation can be data describing an author of a candidate item. For example, an authorship annotation includes an author identifier identifying an author of the candidate item, a timestamp identifying a time the candidate item was published, an address (e.g., a URL) where the candidate item was published and other metadata related to the authorship (e.g., a photo of the author, an occupation of the author, etc.).

In some implementations, the authorship source module 119 receives a query from the widget application 103 which includes data describing an address of a page that a user may be currently visiting. The authorship source module 119 determines a domain or a site that hosts the page using the address of the page. The authorship source module 119 determines an authorship for the page. For example, the authorship source module 119 retrieves an authorship annotation associated with the page and determines an author that provides content on the page. The authorship source module 119 determines one or more authorship items for the user. For example, the authorship source module 119 determines one or more authorship items for the user in part by: (1) cross-referencing the authorship of the page with authorship annotations related to a set of candidate items published on the same site; and (2) determining the one or more authorship items as the candidate items having the same author as the content on the page. The authorship source module 119 sends the one or more authorship items to the widget application 103. The authorship source module 119 is further described below with reference to FIG. 8.

The relevant source module 121 can be code and routines for providing relevant items from a relevant source. A relevant source can be a data source that provides one or more relevant items to the widget application 103. A relevant item can be a candidate item whose topic relates a topic on a page visited by a user. For example, if a user visits a page on a site, a relevant item can be a candidate item on the same site that has the same topic as the topic on the page. In another example, a relevant item can be a candidate item on the same site that has another topic related to the topic on the page. Other examples of relevant items are possible. In some implementations, a relevant item can be presented as a candidate item that "people who read this page also view this candidate item." In some other implementations, a relevant item can be presented as a candidate item that "this candidate item can be popular with people who like the topic on the page." Further examples of relevant items are illustrated with reference to FIGS. 11A and 11B.

In some implementations, the relevant source module 121 receives a query from the widget application 103. The query includes data describing an address of a page (e.g., a URL) currently visited by a user and/or data describing a matching topic for the page. A matching topic can be a topic on the page that matches an interest profile of the user. The interest profile is described below in more detail with reference to FIG. 2. The relevant source module 121 determines a domain or a site that hosts the page using the address of the page. The relevant source module 121 determines one or more relevant items for the user. For example, the relevant source module 121 determines one or more relevant items as one or more candidate items from the same site that either have the same topic as the matching topic or have a topic related to the matching topic. The relevant source module 121 sends the one or more relevant items to the widget application 103. The relevant source module 121 is further described below with reference to FIGS. 7A and 7B.

The popular source module 123 can be code and routines for providing popular items from a popular source. A popular source can be a data source that provides one or more popular items to the widget application 103. A popular item can be a candidate item that has a number of user activities greater than a predetermined threshold in a specific period of time. For example, a popular item can be a candidate item having a number of views greater than a predetermined threshold in a specific period of time. In a further example, a popular item can be a candidate item having at least 5,000 views in a week. In other examples, a popular time can be a candidate item that has a number of comments, a number of shares and/or a number of endorsements greater than predetermined thresholds in a specific time period. In some implementations, a popular item can be a trending candidate item on a site. In some implementations, the popular items can be top-ranking candidate items on a site. For example, the popular items can be the top 10 stories or the top 5 articles on a site. Other examples of popular items are possible.

In some implementations, the popular source module 123 receives a query from the widget application 103. The query includes data describing an address of a page (e.g., a URL) currently visited by a user. The popular source module 123 determines a domain or a site that hosts the page using the address of the page. The popular source module 123 determines one or more popular items from the same site or the same domain for the user. For example, the popular source module 123 determines one or more popular items as one or more candidate items from the same site that have at least 10,000 views in two weeks. The popular source module 123 sends the one or more popular items to the widget application 103.

The user device 115a, 115n may be a computing device that includes a memory and a processor, for example, a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. In the illustrated implementation, the user device 115a is communicatively coupled to the network 105 via signal line 108. The user 125a interacts with the user device 115a. The user device 115n is communicatively coupled to the network 105 via signal line 110. The user 125n interacts with the user device 115n. In some implementations, the widget application 103 acts in part as a thin-client application that may be stored on the user devices 115a, 115n and in part as components that may be stored on one or more of the servers.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
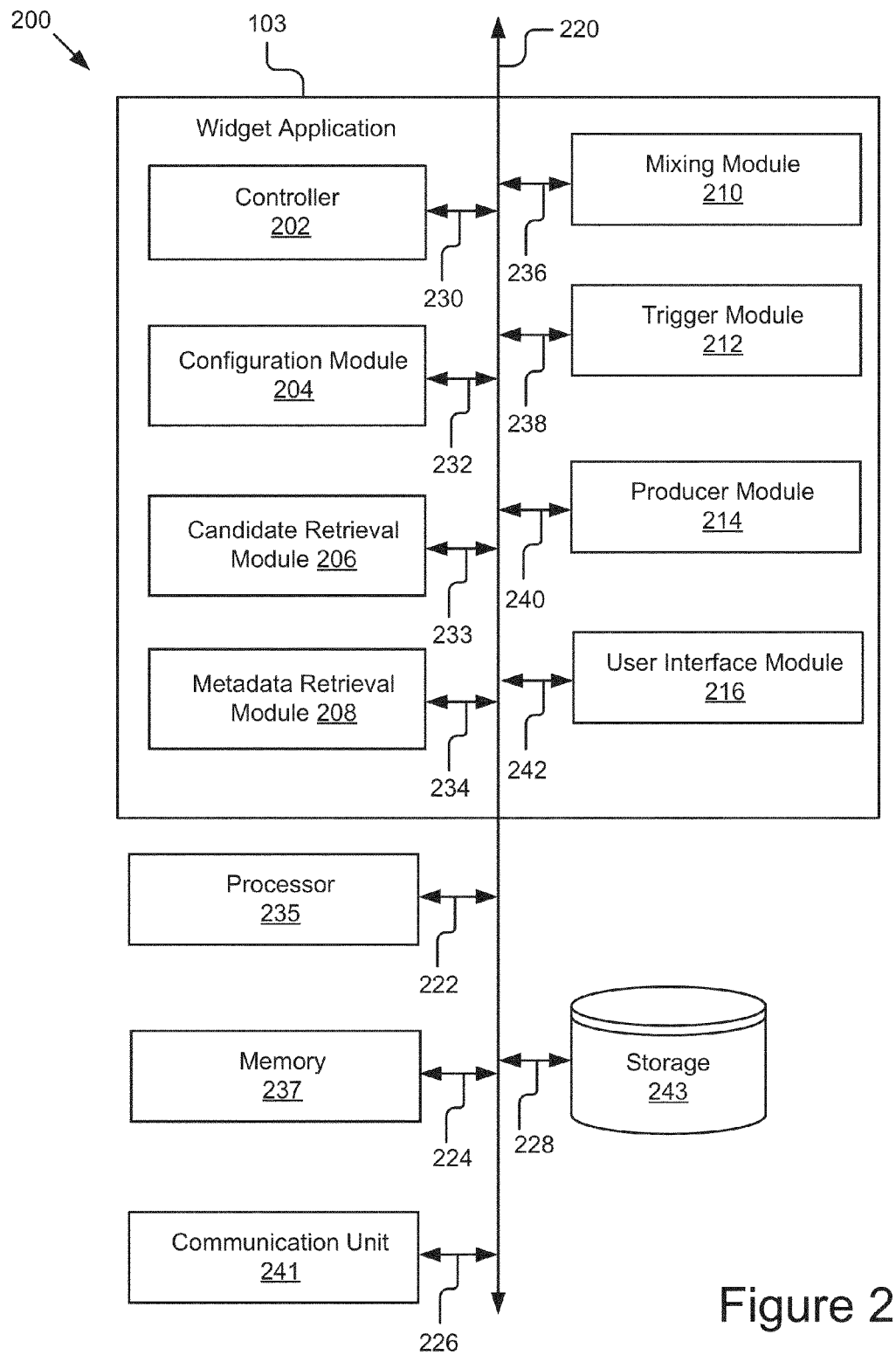
FIG. 2 is a block diagram illustrating an example of a widget application.

Referring now to FIG. 2, an example of the widget application 103 is shown in more detail. FIG. 2 is a block diagram of a computing device 200 that includes a widget application 103, a processor 235, a memory 237, a communication unit 241 and a storage device 243 according to some examples. The components of the computing device 200 are communicatively coupled by a bus 220. In some implementations, the computing device 200 can be one of a publisher server 107, a social network server 101 and a second server 157.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations can be possible.

The memory 237 stores instructions and/or data that may be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the user device 115, the second server 157, the source server 113, the publisher server 107 and the social network server 101 depending upon where the widget application 103 may be stored. The communication unit 241 is coupled to the bus 220 via signal line 226. In some implementations, the communication unit 241 includes a port for direct physical connection to the network 105 or to another communication channel. For example, the communication unit 241 includes a USB, SD, CAT-5 or similar port for wired communication with the user device 115. In some implementations, the communication unit 241 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 243 can be a non-transitory memory that stores data for providing the functionality described herein. The storage device 243 may be a dynamic random access memory (DRAM) device, a static random access memory (SRAM) device, flash memory or some other memory devices. In some implementations, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 243 is communicatively coupled to the bus 220 via signal line 228.

In some implementations, the storage device 243 stores one or more of configuration data describing a configuration for content recommendation on a site, candidate items retrieved from one or more sources (e.g., social items, authorship items, relevant items and popular items), metadata associated with the candidate items, score data describing scores for candidate items and/or profile data describing an interest profile of a user upon the consent of the users. The configuration data, metadata, score data and profile data are described below in more detail.

In the illustrated implementation shown in FIG. 2, the widget application 103 includes a controller 202, a configuration module 204, a candidate retrieval module 206, a metadata retrieval module 208, a mixing module 210, a trigger module 212, a producer module 214 and a user interface module 216. These components of the widget application 103 are communicatively coupled to each other via the bus 220.

The controller 202 can be software including routines for handling communications between the widget application 103 and other components of the computing device 200. In some implementations, the controller 202 can be a set of instructions executable by the processor 235 to provide the functionality described below for handling communications between the widget application 103 and other components of the computing device 200. In some other implementations, the controller 202 can be stored in the memory 237 of the computing device 200 and can be accessible and executable by the processor 235. The controller 202 may be adapted for cooperation and communication with the processor 235 and other components of the computing device 200 via signal line 230.

In some implementations, the controller 202 sends and receives data, via the communication unit 241, to and from one or more devices and servers in the system 100. For example, the controller 202 receives a query from the candidate retrieval module 206 and sends the query via the network 105 to one or more of the social source module 117, the authorship source module 119, the relevant source module 121 and the popular source module 123. In another example, the controller 202 receives, via the communication unit 241, data describing one or more candidate items retrieved from one or more sources and sends the data to the candidate retrieval module 206.

In some implementations, the controller 202 handles communications between different components of the widget application 103. For example, the controller 202 receives data describing candidate items from the candidate retrieval module 206 and sends the data to the metadata retrieval module 208 and/or the mixing module 210. In another example, the controller 202 receives metadata from the metadata retrieval module 208 and sends the metadata to the mixing module 210.

In some implementations, the controller 202 receives data from components of the widget application 103 and stores the data in the storage device 243. For example, the controller 202 receives score data describing one or more scores from the mixing module 210 and stores the score data in the storage device 243. In some implementations, the controller 202 retrieves data from the storage device 243 and sends the data to components of the widget application 103. For example, the controller 202 retrieves profile data describing an interest profile of a user from the storage device 243 and sends the profile data to the mixing module 210.

The configuration module 204 can be software including routines for configuring content recommendation on a site. In some implementations, the configuration module 204 can be a set of instructions executable by the processor 235 to provide the functionality described below for configuring content recommendation on a site. In some other implementations, the configuration module 204 can be stored in the memory 237 of the computing device 200 and can be accessible and executable by the processor 235. The configuration module 204 may be adapted for cooperation and communication with the processor 235 and other components of the computing device 200 via signal line 232.

In some implementations, the configuration module 204 receives input data from an administrator of a site and configures a site setting for content recommendation using the input data. A site setting can be data indicating whether to activate or deactivate the content recommendation functionality on a site. For example, the configuration module 204 generates a site setting that activates the content recommendation functionality on the site based on input data indicating the activation of the content recommendation functionality. In another example, the configuration module 204 generates a site setting that deactivates the content recommendation functionality on the site based on input data indicating the deactivation of the content recommendation functionality.

In some implementations, the configuration module 204 receives input data from a user visiting a page on a site, and configures a user setting for the user using the input data. A user setting can be data indicating whether to activate or deactivate the content recommendation functionality on a site for a particular user. For example, if the input data indicates that a particular user chooses to deactivate content recommendation on the site, the configuration module 204 generates a user setting to deactivate the content recommendation functionality for the particular user on the site. In another example, if an administrator of the site already activates the content recommendation functionality for the site and the input data from a particular user indicates that the particular user chooses to activate content recommendation on the site, the configuration module 204 generates a user setting to activate the content recommendation functionality for the particular user.

In some implementations, the configuration module 204 configures one or more display settings for an invitation state and/or a recommendation state. The invitation state and the recommendation state are described below in more detail. A display setting can be data describing instructions on how to present an invitation state and/or a recommendation state. For example, a display setting indicates to present an invitation state as an overlay bar having a height of fifty pixels that pushes up from a bottom of a browser if an invitation trigger event occurs. In another example, a display setting indicates to present a recommendation state as a modal overlay on a page. Other examples of display settings include, but are not limited to, embedding an invitation state directly into a page, sliding content on a page off screen and presenting a recommendation state at the bottom of the page if a recommendation trigger event occurs, an amount of content to be displayed in an invitation state and an amount of content to be displayed in a recommendation state, etc. In some implementations, the configuration module 204 receives input data from an administrator of a site and configures one or more display settings for a site using the input data.

An invitation trigger event can be data describing one or more conditions under which an invitation state can be presented to a user. Examples of an invitation trigger event include, but are not limited to: (1) presence of qualified candidate items for the site and the user (e.g., presence of social items, authorship items, relevant items, popular items, etc., from the same site for the user); (2) a time duration that the user has spent on the page may be greater than a time threshold (e.g., the user has stayed on the page for more than 2 minutes); (3) the user has scrolled to a specified location of the page (e.g., the user has scrolled down to two thirds of the page); (4) a tag for presenting an invitation state may be deployed at the end of the content body on the page. Other examples of an invitation trigger event are possible.

A recommendation trigger event can be data describing one or more conditions under which a recommendation state can be presented to a user. For example, a recommendation trigger event can be that a user taps or clicks on the invitation state. In another example, a recommendation trigger event can be that a cursor hovers over the invitation state. Other examples of a recommendation trigger event are possible.

In some implementations, the configuration module 204 configures one or more trigger settings for an invitation trigger event and/or a recommendation trigger event. A trigger setting can be data describing one or more requirements under which an invitation trigger event and/or a recommendation trigger event occur. For example, a trigger setting indicates a time threshold or a specific location of a page for determining whether an invitation trigger event has occurred. Other examples of a trigger setting are possible. In some implementations, the configuration module 204 receives input data from an administrator of a site and configures one or more trigger settings for a site using the input data.

In some implementations, the configuration module 204 stores configuration data describing one or more of a site setting, a user setting, a display setting and a trigger setting in the storage device 243. In some implementations, the configuration module 204 sends the configuration data to one or more of the candidate retrieval module 206, the trigger module 212 and/or the producer module 214.

The candidate retrieval module 206 can be software including routines for retrieving one or more candidate items from one or more sources. In some implementations, the candidate retrieval module 206 can be a set of instructions executable by the processor 235 to provide the functionality described below for retrieving one or more candidate items from one or more sources. In some other implementations, the candidate retrieval module 206 can be stored in the memory 237 of the computing device 200 and can be accessible and executable by the processor 235. The candidate retrieval module 206 may be adapted for cooperation and communication with the processor 235 and other components of the computing device 200 via signal line 233.

In some implementations, the candidate retrieval module 206 generates a query that includes an address of a page visited by a user and identification data identifying the user. The candidate retrieval module 206 queries the social source by sending the query to the social source module 117 and receives one or more social items for the user from the social source. For example, the candidate retrieval module 206 queries the social source to retrieve a social item that has been published on the same site as the page and recommended by a friend of the user.

In some implementations, the candidate retrieval module 206 generates a query that includes an address of a page visited by a user. The candidate retrieval module 206 queries the authorship source by sending the query to the authorship source module 119 and receives one or more authorship items for the user from the authorship source. For example, the candidate retrieval module 206 queries the authorship source to retrieve an authorship item provided by the same author of the content on the page. The authorship item can be published on the same site as the page.

In some implementations, the candidate retrieval module 206 generates a query that includes an address of a page visited by a user. The candidate retrieval module 206 queries the popular source by sending the query to the popular source module 123 and receives one or more popular items for the user from the popular source. For example, the candidate retrieval module 206 queries the popular source to retrieve a popular item having the greatest views on the site. The popular item can be published on the same site as the page.

In some implementations, the candidate retrieval module 206 generates a query that includes an address of a page visited by a user. The candidate retrieval module 206 queries the relevant source by sending the query to the relevant source module 121 and receives one or more relevant items for the user from the relevant source. For example, the candidate retrieval module 206 queries the relevant source to retrieve a relevant item that can be represented as "people who view the page also view this candidate item."

In some implementations, the candidate retrieval module 206 determines one or more topics related to a page currently visited by a user. Examples of a topic include, but are not limited to, news, pop music, funny stories, vacations, science fiction, adventure fiction, etc. The candidate retrieval module 206 cross-references the one or more topics related to the page with an interest profile of the user to obtain a matching topic. An interest profile can be data describing what a user may be interested in. For example, the interest profile includes an interest, a hobby, a personal preference, demographic data, etc., associated with a user and/or one or more topics that the user may be interested in. A matching topic can be a topic that matches an interest profile of a user. For example, if a page visited by a user relates to a science-fiction topic and an interest profile indicates that the user loves technology and science, the candidate retrieval module 206 determines the matching topic as the science-fiction topic. The candidate retrieval module 206 generates a query that includes an address of the page and the matching topic and sends the query to the relevant source module 121. The candidate retrieval module 206 receives one or more relevant items that match the matching topic from the relevant source. The one or more relevant items can be represented as candidate items "popular with people who love the matching topic."

Optionally, the candidate retrieval module 206 determines one or more topics related to the one or more relevant items and determines a recurring topic from the one or more topics. The candidate retrieval module 206 determines a subset of relevant items from the one or more relevant items that relates to the recurring topic. A recurring topic can be a topic that appears more than once in one or more candidate items. For example, the candidate retrieval module 206 receives 3 relevant items related to science fiction including: (1) a first relevant item describing images for best science-fiction movies; (2) a second relevant item describing a review for best science-fiction movies; and (3) a third relevant item describing a life story of a science-fiction novelist. The candidate retrieval module 206 determines a recurring topic as "best science-fiction movies" and determines a subset of relevant items related to the recurring topic including the first relevant item and the second relevant item.

By performing operations similar to those described above, the candidate retrieval module 206 queries one or more different sources to retrieve a set of candidate items via the network 105. The one or more different sources include a social source, an authorship source, a relevant source and a popular source. The set of candidate items include one or more of social items, relevant items or a subset of relevant items related to a recurring topic, authorship items and popular items. The candidate retrieval module 206 optionally compiles a list of candidate items from the set of candidate items. The candidate retrieval module 206 optionally filters the set of candidate items by a specific domain that the page belongs to, so that the filtered candidate items originate from the same site as the page. The candidate retrieval module 206 sends the set of candidate items to the metadata retrieval module 208 and/or the mixing module 210.

The metadata retrieval module 208 can be software including routines for retrieving metadata associated with one or more candidate items. In some implementations, the metadata retrieval module 208 can be a set of instructions executable by the processor 235 to provide the functionality described below for retrieving metadata associated with one or more candidate items. In some other implementations, the metadata retrieval module 208 can be stored in the memory 237 of the computing device 200 and can be accessible and executable by the processor 235. The metadata retrieval module 208 may be adapted for cooperation and communication with the processor 235 and other components of the computing device 200 via signal line 234.

In some implementations, the metadata retrieval module 208 receives one or more candidate items from the candidate retrieval module 206 and retrieves metadata associated with the one or more candidate items from one or more sources that provide the candidate items. Examples of metadata associated with a candidate item include, but are not limited to, a thumbnail, a title, keywords, a timestamp indicating a time the candidate item was published, social activity data associated with the candidate item (e.g., a number of comments, endorsements, shares, recommendations, etc., associated with the candidate item) and one or more topics involved in the candidate item, etc. The metadata retrieval module 208 sends the one or more candidate items and/or the associated metadata to the mixing module 210.

The mixing module 210 can be software including routines for managing one or more candidate items. In some implementations, the mixing module 210 can be a set of instructions executable by the processor 235 to provide the functionality described below for managing one or more candidate items. In some other implementations, the mixing module 210 can be stored in the memory 237 of the computing device 200 and can be accessible and executable by the processor 235. The mixing module 210 may be adapted for cooperation and communication with the processor 235 and other components of the computing device 200 via signal line 236.

In some implementations, the mixing module 210 receives one or more candidate items and the associated metadata from the candidate retrieval module 206 and/or the metadata retrieval module 208. The mixing module 210 determines a score for each candidate item so that one or more scores can be generated for the one or more candidate items. In some implementations, the mixing module 210 determines a score for a candidate item based on one or more score factors. For example, if a score factor indicates that (1) a first topic in a first candidate item matches an interest profile of the user and (2) a second topic in a second candidate item does not match the interest profile of the user, the mixing module 210 determines a higher score for the first candidate item than the second candidate item. In another example, if a score factor indicates that a number of friends that have endorsed, commented on and/or shared a first candidate item exceed that of a second candidate item, the mixing module 210 determines a higher score for the first candidate item than the second candidate item.

A score factor can be data describing a parameter for determining a score. Examples of score factors include, but are not limited to, a publication time of the candidate item, a degree of similarity between topics in the candidate item and a user's interest profile, a degree of similarity between topics in the candidate item and topics related to the page currently visited by the user, a number of other users connected to the user in a social graph that have performed social activities on the candidate item (e.g., a number of friends that have endorsed, commented on and/or shared the candidate item), a number of other users that may or may not be connected to the user in a social graph and that have performed social activities on the candidate item (e.g., a total number of users that endorsed, commented on or shared the candidate item), behavior of other users that visit the same page as the user (e.g., whether people that visit the same page will also view the candidate item, whether the candidate item can be popular with people who like the topic on the page, etc.) and whether content of the candidate item has the same authorship as the content of the page visited by the user.

In some implementations, candidate items from different sources can be scored according to a scoring hierarchy for different source types. A scoring hierarchy can be data indicating to generate scores for candidate items based on source types related to the candidate items. For example, a scoring hierarchy can be "social source>authorship source>relevant source>popular source," which indicates: (1) candidate items from a social source have a higher score than other candidate items from other sources; (2) candidate items from an authorship source have a higher score than candidate items from a relevant source or a popular source; and (3) candidate items from a relevant source have a higher score than other candidate items from a popular source. In other examples, the source types in a scoring hierarchy may be in a different order. For example, the scoring hierarchy can be "authorship source>social source>relevant source>popular source." A scoring hierarchy can be configured by an administrator of the computing device 200.

In some implementations, the mixing module 210 ranks the one or more candidate items to generate one or more top-ranking candidate items based on the one or more scores related to the one or more candidate items. For example, the mixing module 210 generates a higher ranking for a first candidate item having a higher score than a second candidate item having a lower score. In some implementations, the mixing module 210 ranks the one or more candidate items to generate one or more top-ranking candidate items based on source types related to the candidate items. For example, candidate items from a social source have a higher ranking than candidate items from other sources; candidate items from an authorship source have a higher ranking than candidate items from a relevant source or a popular source; and candidate items from a relevant source have a higher ranking than candidate items from a popular source. The mixing module 210 sends the one or more top-ranking candidate items to the producer module 214.

The trigger module 212 can be software including routines for determining an invitation trigger event and/or a recommendation trigger event. In some implementations, the trigger module 212 can be a set of instructions executable by the processor 235 to provide the functionality described below for determining an invitation trigger event and/or a recommendation trigger event. In some other implementations, the trigger module 212 can be stored in the memory 237 of the computing device 200 and can be accessible and executable by the processor 235. The trigger module 212 may be adapted for cooperation and communication with the processor 235 and other components of the computing device 200 via signal line 238.

In some implementations, the trigger module 212 determines that an invitation trigger event occurs if one or more of the following conditions may be satisfied: (1) presence of qualified candidate items for the site and the user (e.g., presence of social items, authorship items, relevant items, popular items, etc., from the same site for the user); (2) a time duration that the user has spent on the page may be greater than a time threshold (e.g., the user stays on the page for more than 2 minutes); (3) the user has scrolled to a specified location of the page (e.g., the user has scrolled to two thirds of the page); and (4) a tag for presenting an invitation state may be deployed at the end of the content body on the page. Other example conditions for determining an occurrence of an invitation trigger event are possible. The trigger module 212 sends a signal indicating an occurrence of an invitation trigger event to the producer module 214.

In some implementations, the trigger module 212 determines that a recommendation trigger event occurs if a user taps or clicks on an invitation state or a cursor hovers over the invitation state. The trigger module 212 sends a signal indicating an occurrence of a recommendation trigger event to the producer module 214.

The producer module 214 can be software including routines for providing an invitation state and/or a recommendation state to users. In some implementations, the producer module 214 can be a set of instructions executable by the processor 235 to provide the functionality described below for providing an invitation state and/or a recommendation state to users. In some other implementations, the producer module 214 can be stored in the memory 237 of the computing device 200 and can be accessible and executable by the processor 235. The producer module 214 may be adapted for cooperation and communication with the processor 235 and other components of the computing device 200 via signal line 240.

In some implementations, the producer module 214 handles communications between different components of the widget application 103. For example, the producer module 214 receives data describing candidate items from the candidate retrieval module 206 and sends the data to the metadata retrieval module 208 and/or the mixing module 210. In another example, the producer module 214 receives metadata from the metadata retrieval module 208 and sends the metadata to the mixing module 210.

In some implementations, the producer module 214 receives one or more candidate items (e.g., top-ranking candidate items) from the mixing module 210. If the producer module 214 receives a signal indicating an occurrence of an invitation trigger event from the trigger module 212, the producer module 214 generates an invitation state for the user. However, if no candidate items can be available for a user, the producer module 214 does not provide an invitation state to the user even if an invitation trigger event has occurred.

An invitation state can be data inviting a user to view additional content on a site. For example, an invitation state includes data describing a candidate item having the highest ranking and descriptive data associated with the candidate item. In some implementations, the descriptive data describes a source type of the candidate item (e.g., a social source, an authorship source, a relevant source or a popular source). In some implementations, the descriptive data describes a reason why the invitation state can be presented to the user. Examples of the descriptive data include, but are not limited to: a friend has shared, commented on or endorsed this candidate item; people who visits this page also like to view this candidate item; the author who writes the article in this page also writes the story in this candidate item; and most popular content in this site, etc.

For example, if a candidate item included in the invitation state has an endorsement from another user connected to the user in a social graph, the invitation state includes the other user's name, avatar and a description of "the other user recommends this candidate item." In another example, if a candidate item included in the invitation state has been shared by another user connected to the user in a social graph, the invitation state includes the other user's name, avatar and a description of "the other user shares this candidate item." In yet another example, if a candidate item included in the invitation state has a comment from another user connected to the user in a social graph, the invitation state includes the other user's name, avatar and a description of "the other user comments on this candidate item." In still yet another example, if a candidate item included in the invitation state has the same authorship as content in the page, the invitation state includes the author's name, avatar and a description of "the author also writes this candidate item."

In some implementations, the producer module 214 provides the invitation state to the user according to one or more display settings. For example, the producer module 214 presents an invitation state as an overlay on a page (e.g., an overlay bar having a height of fifty pixels that pushes up from a bottom of a browser). In another example, the producer module 214 embeds an invitation state directly into a page. In some implementations, the producer module 214 determines the presentation of the invitation state on the page based on heuristic techniques. For example, the producer module 214 determines a location to present the invitation state using heuristic techniques. The producer module 214 sends the invitation state to the user interface module 216, causing the user interface module 216 to generate graphical data for presenting the invitation state in a user interface. In some implementations, the invitation state recedes out of view if the user scrolls passing a specified location of the page without clicking on the invitation state.

If the producer module 214 receives a signal indicating an occurrence of a recommendation trigger event from the trigger module 212, the producer module 214 generates a recommendation state for the user. A recommendation state can be data describing content recommendation for a user. For example, a recommendation state includes at least a subset of the one or more top-ranking candidate items and source types related to the subset of the one or more top-ranking candidate items. In some implementations, the candidate items in the recommendation state can be prioritized based on the scores and/or source types related to the candidate items. In some implementations, the recommendation state additionally includes one or more action cards for performing one or more engagement actions (e.g., endorsement, comments, shares, etc.) associated with the subset of the one or more top-ranking candidate items. Examples of an action card include, but are not limited to, a share card, a follow card, a URL card, etc.

A share card of a candidate item can be data describing a sharer that shares the candidate item. A share card allows a user to re-share the candidate item with other users. A sharer can be another user who has shared the candidate item and connects to the user in a social graph. For example, a sharer can be a friend that has shared the candidate item. In some implementations, a share card includes one or more of: a sharer's name; a sharer's avatar; a sharer's comment if available; an image from the candidate item if available; a title of the candidate item; a domain or a site hosting the candidate item; one or more engagement action buttons (e.g., an endorsement button, a share button, a comment button, a button for re-sharing the share, etc.); and avatars of one or more other users connected to the user in a social graph that have interacted with the candidate item by endorsing, commenting on and/or sharing the candidate item, etc.

A follow card of a candidate item can be data describing a persona (e.g., an author) or a brand of the candidate item. An example of a brand can be an endorsed page that can be linked to the site currently visited by the user. For example, a follow card includes a persona or brand's avatar, a persona or brand's name, a persona's occupation and a follow button allowing the user to follow the persona or brand.

A URL card can be data describing an address of a candidate item. For example, a URL card includes an URL of the candidate item, a hyperlink to the URL and one or more engagement action buttons. In some implementations, the URL card can be used for candidate items that do not have social activities from other users connected to the user in a social graph (e.g., candidate items having no social activities from friends) or candidate items that were publicly endorsed/shared/commented on by other users not connected to the user in a social graph.

In some implementations, the producer module 214 provides the recommendation state to the user according to one or more display settings. For example, the producer module 214 presents the recommendation state as a modal overlay on a page. In another example, the producer module 214 slides content on a page off screen and presents the recommendation state at the bottom of the page. The producer module 214 sends the recommendation state to the user interface module 216, causing the user interface module 216 to generate graphical data for presenting the recommendation state in a user interface. The user can interact with the recommendation state by performing one or more engagement actions. For example, the user can click on an endorsement button, a share button and/or a comment button, re-share the share, expand the share, click on a profile, click on a URL, expand the comments, post a comment and/or click on a hyperlink to redirect to the candidate item on a new page, etc. The user may scroll through the subset of top-ranking candidate items and/or close the recommendation state to return to the previously visited page.

The user interface module 216 can be software including routines for generating graphical data for providing user interfaces. In some implementations, the user interface module 216 can be a set of instructions executable by the processor 235 to provide the functionality described below for generating graphical data for providing user interfaces. In some other implementations, the user interface module 216 can be stored in the memory 237 of the computing device 200 and can be accessible and executable by the processor 235. The user interface module 216 may be adapted for cooperation and communication with the processor 235 and other components of the computing device 200 via signal line 242.

In some implementations, the user interface module 216 generates graphical data for providing a user interface that depicts an invitation state or a recommendation state. The user interface module 216 sends the graphical data to a user device 115 operated by a user, causing the user device 115 to present the invitation state or the recommendation state to the user via the user interface. The user interface module 216 may generate graphical data for providing other user interfaces to users.

Figure 3:
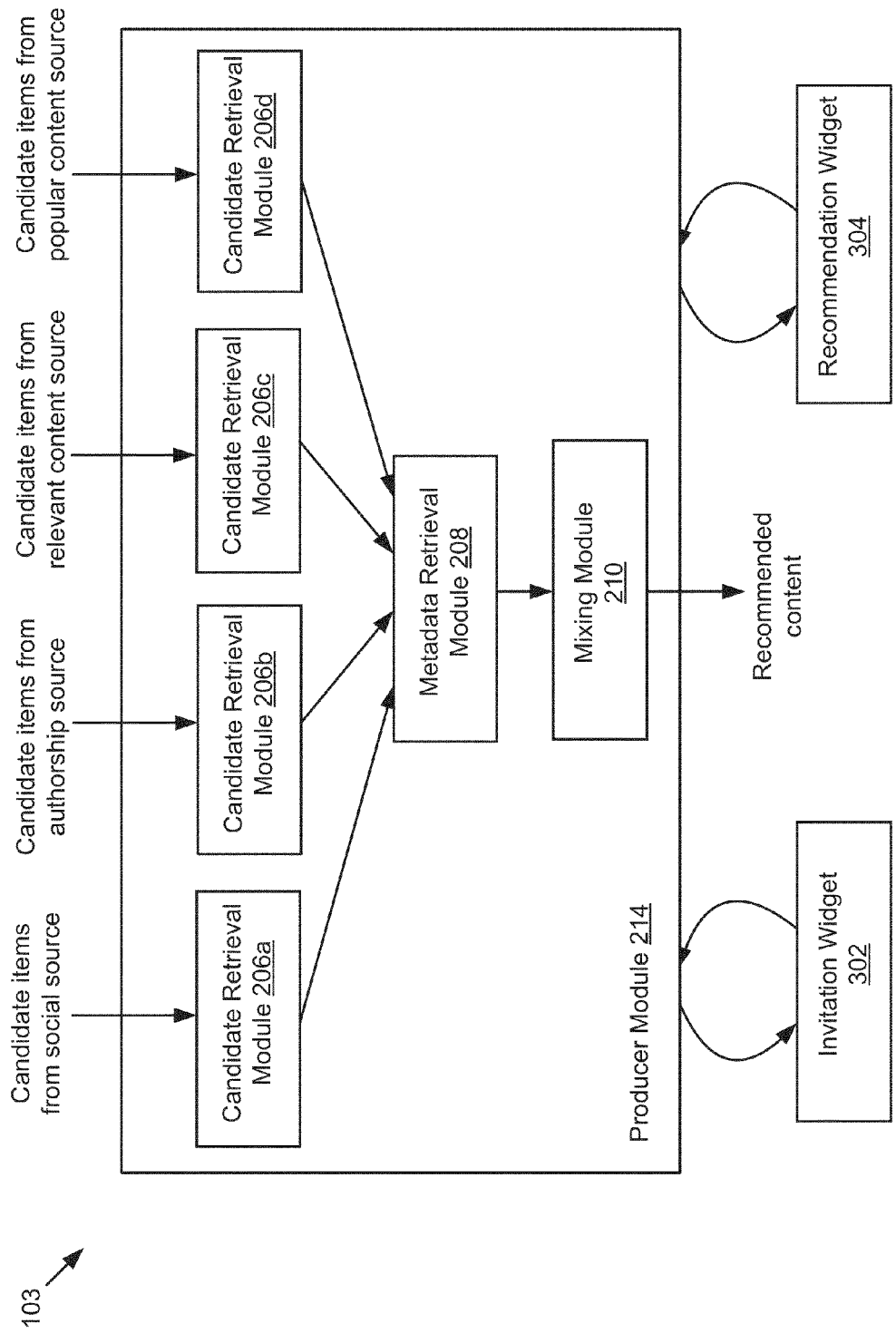
FIG. 3 is a block diagram illustrating another example of a widget application.

Referring now to FIG. 3, another example of the widget application 103 is shown in more detail. In the illustrated implementation, the widget application 103 includes a producer module 214, an invitation widget 302 and a recommendation widget 304. The producer module 214 includes candidate retrieval modules 206a, 206b, 206c, 206d, a metadata retrieval module 208 and a mixing module 210. Like reference numerals are used to refer to similar elements, and the descriptions will not be repeated here.

In some implementations, the candidate items can be retrieved from different sources in parallel. The candidate retrieval module 206a retrieves candidate items (e.g., social items) from a social source; the candidate retrieval module 206b retrieves candidate items (e.g., authorship items) from an authorship source; the candidate retrieval module 206c retrieves candidate items (e.g., relevant items) from a relevant source; and the candidate retrieval module 206d retrieves candidate items (e.g., popular items) from a popular source. The candidate retrieval modules 206a, 206b, 206c, 206d send the candidate items to the metadata retrieval module 208. The metadata retrieval module 208 retrieves metadata for the candidate items and sends the candidate items and associated metadata to the mixing module 210. The mixing module 210 determines scores for the candidate items and ranks the candidate items to generate one or more top-ranking candidate items. The producer module 214 generates recommended content for the user using the one or more top-ranking candidate items.

The invitation widget 302 can be code and routines describing an application programming interface (API) for presenting an invitation state. The recommendation widget 304 can be code and routines describing an API for presenting a recommendation state. For example, the invitation widget 302 and the recommendation widget 304 can be iframe elements on a page.

Figure 4:
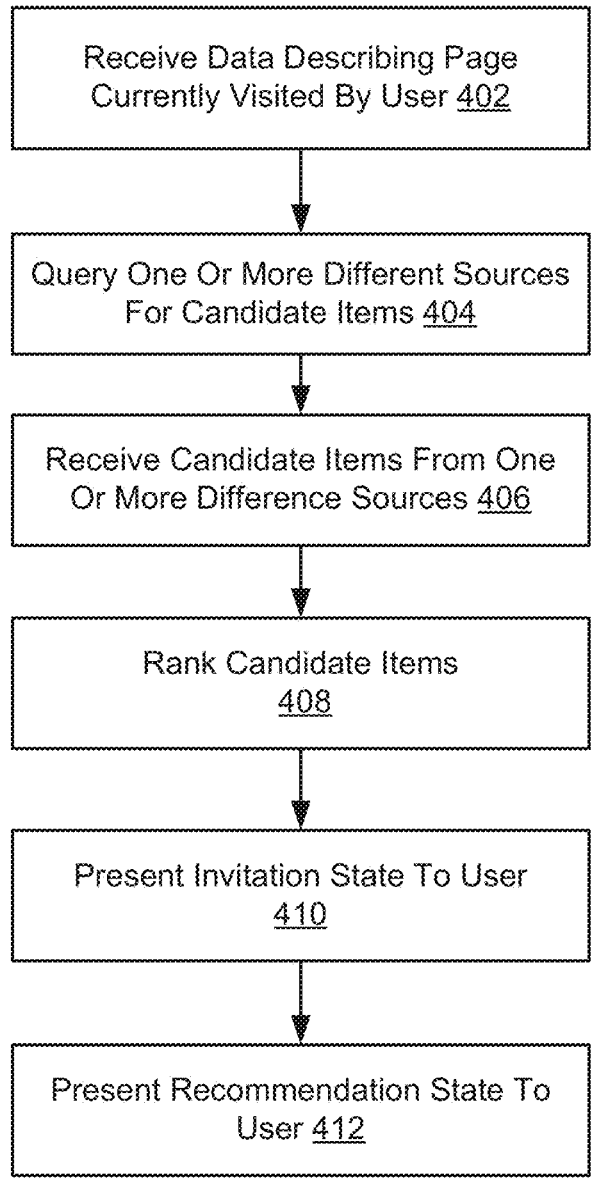
FIG. 4 is a flowchart of an example method for providing content recommendation to users on a site.

Referring now to FIG. 4, an example of a method 400 for providing content recommendation to users on a site is described. In some implementations, the method 400 determines a page currently visited by a user. The controller 202 receives 402 data describing the page currently visited by the user. The candidate retrieval module 206 queries 404 one or more different sources for candidate items. The candidate retrieval module 206 receives 406, via the controller 202, candidate items from the one or more different sources. The mixing module 210 ranks 408 the candidate items. The producer module 214 presents 410 an invitation state to the user if an invitation trigger event occurs. The producer module 214 presents 412 a recommendation state to the user if a recommendation trigger event occurs.

Figure 5A:
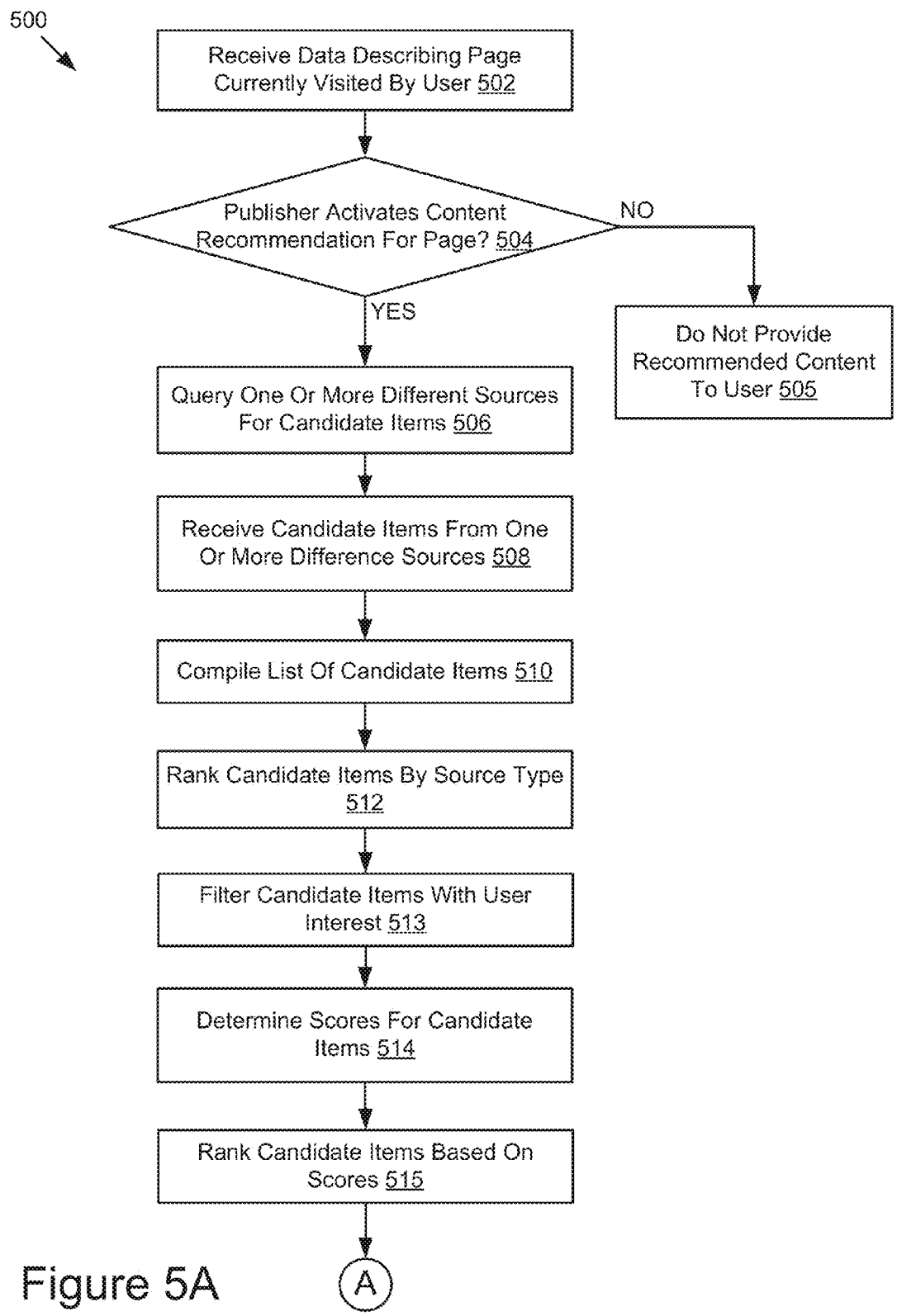
FIGS. 5A and 5B are flowcharts of another example method for providing content recommendation to users on a site.
Figure 5B:
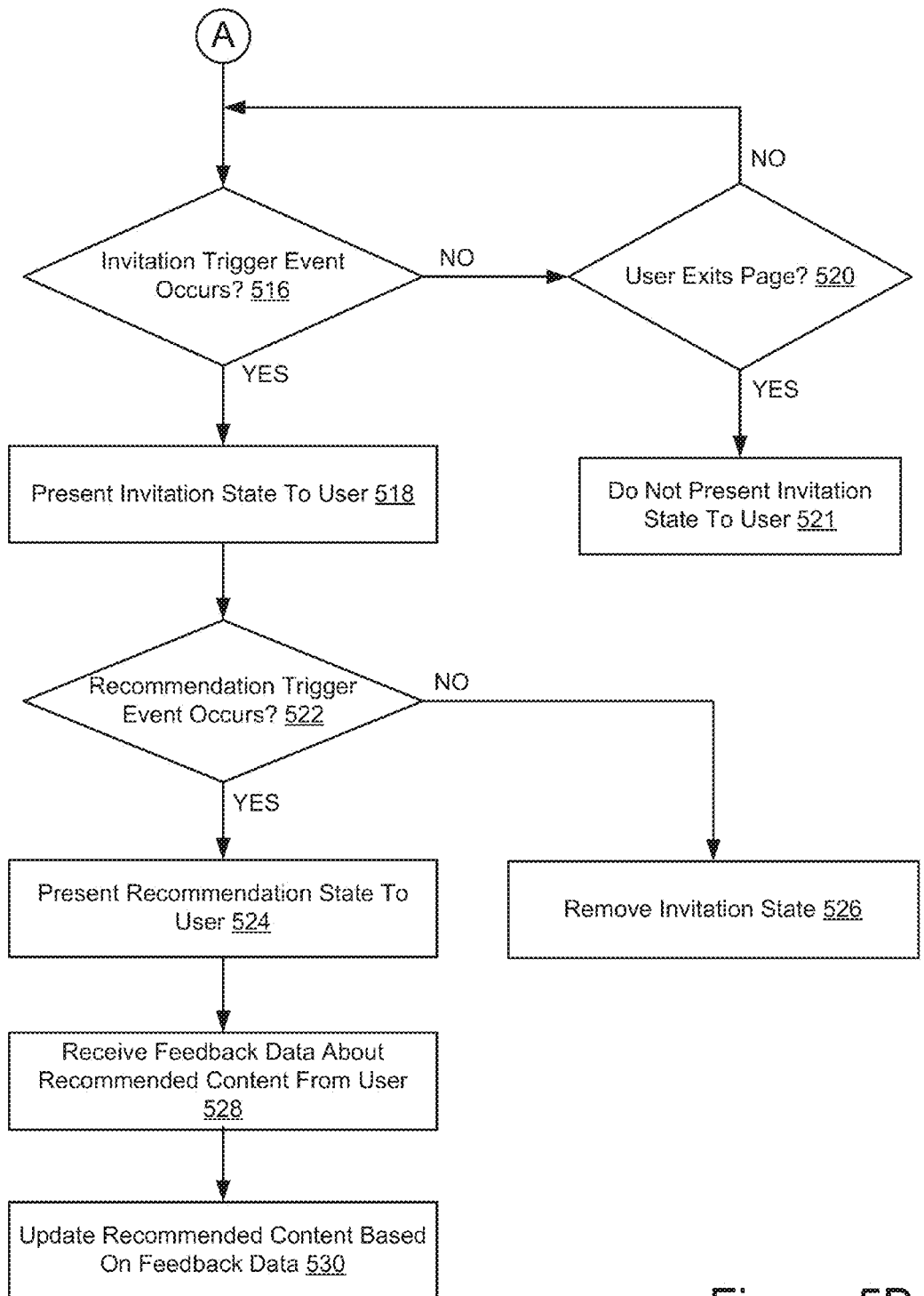

FIGS. 5A and 5B are flowcharts of another example method 500 for providing content recommendation to users on a site. In some implementations, the method 500 determines a page currently visited by a user. Referring to FIG. 5A, the controller 202 receives 502 data describing the page currently visited by the user. The configuration module 204 determines 504 whether a publisher of the page activates content recommendation for the page. If the publisher does not activate the content recommendation, the method 500 does not provide 505 recommended content to the user. Otherwise, the method 500 moves to block 506.

At block 506, the candidate retrieval module 206 queries 506 one or more different sources for candidate items. The candidate retrieval module 206 receives 508, via the controller 202, candidate items from the one or more different sources. The candidate retrieval module 206 optionally compiles 510 a list of candidate items from the received candidate items. The candidate retrieval module 206 sends the candidate items to the mixing module 210. The mixing module 210 optionally ranks 512 the candidate items by one or more source types related to the candidate items. The mixing module 210 optionally 513 filters the candidate items based on interests of the user. The mixing module 210 determines 514 scores for the candidate items and ranks 515 the candidate items based on the scores. In some implementations, operations performed at block 513 can be combined with operations performed at block 514.

Referring now to FIG. 5B, the trigger module 212 determines 516 whether an invitation trigger event occurs. If an invitation trigger event occurs, the method 500 moves to block 518. Otherwise, the method 500 moves to block 520. At block 520, the method 500 determines whether the user has exited the page. If the user has not exited the page, the method 500 moves to block 516. If the user has exited the page, the method 500 does not present 521 an invitation state to the user.

At block 518, the producer module 214 presents 518 an invitation state to the user. The trigger module 212 determines 522 whether a recommendation trigger event occurs. If a recommendation trigger event does not occur, the producer module 214 removes 526 the invitation state. If a recommendation trigger event occurs, the producer module 214 presents 524 a recommendation state to the user. The user can interact with the recommended content included in the recommendation state. Optionally, the controller 202 receives 528 feedback data about the recommended content from the user and the producer module 214 updates 530 the recommended content based on the feedback data. In some implementations, the page visited by the user and the recommended content can be from the same site.

Figure 6A:
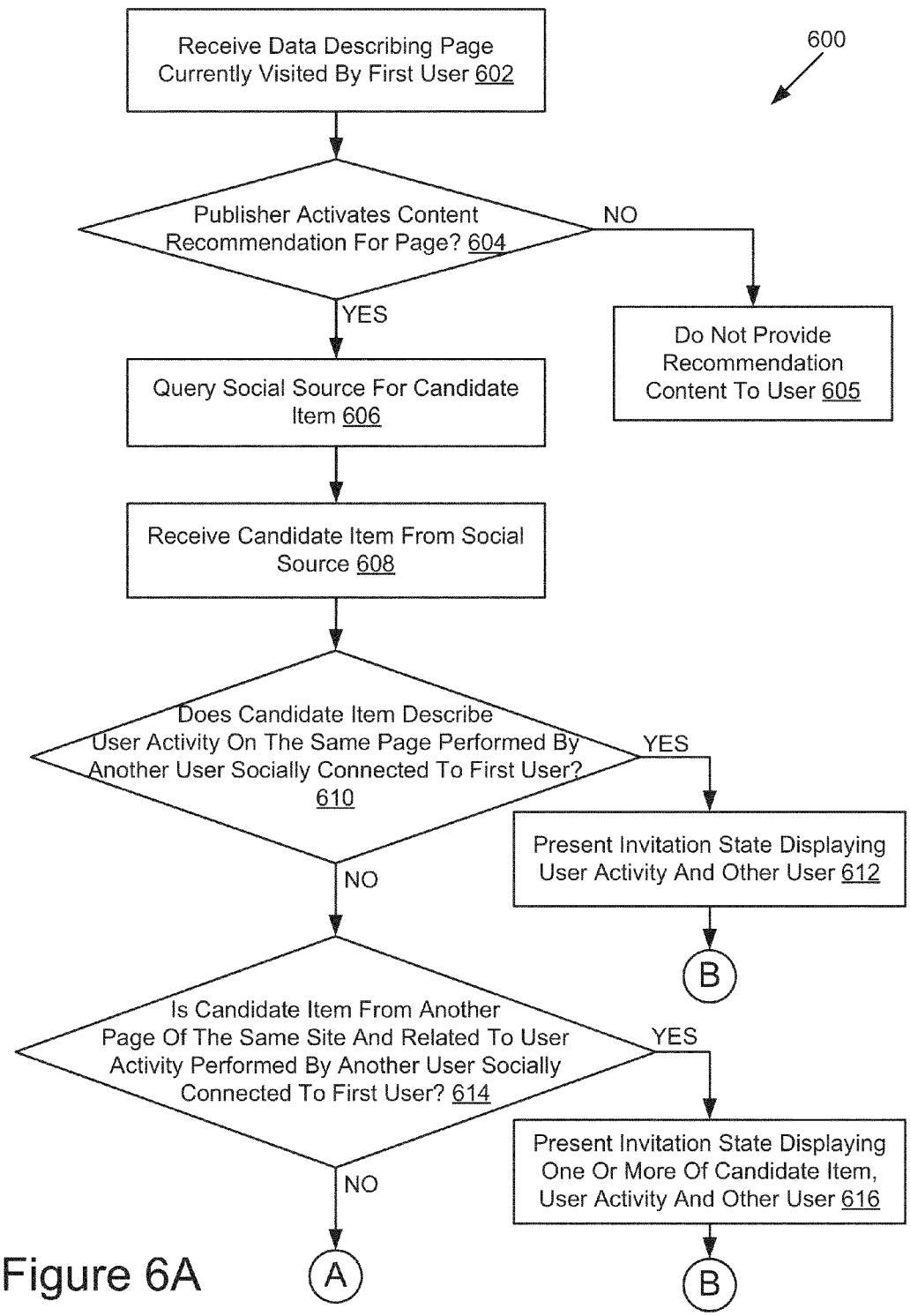
FIGS. 6A-6D are flowcharts of yet another example method for providing content recommendation to users on a site.

FIGS. 6A-6D are flowcharts of yet another example method 600 for providing content recommendation to users on a site. Referring to FIG. 6A, the controller 202 receives 602 data describing a page currently visited by a first user. The configuration module 204 determines 604 whether a publisher of the page activates content recommendation for the page. If the publisher does not activate the content recommendation, the method 600 does not provide 605 recommended content to the user. Otherwise, the method 600 moves to block 606.

At block 606, the candidate retrieval module 206 queries a social source for candidate items. The candidate retrieval module 206 receives 608, via the controller 202, a candidate item (e.g., a social item) from the social source. The producer module 214 determines 610 whether the candidate item describes a user activity on the same page and performed by another user who socially connects to the first user in a social graph. For example, the producer module 214 determines whether the candidate item can be an endorsement, a share or a comment on the same page from a friend of the first user. If the candidate item describes a user activity on the same page and from another user socially connected to the first user, the producer module 214 presents 612 an invitation state displaying the user activity and a name of the other user to the first user. Otherwise, the method 600 moves to block 614.

At block 614, the producer module 214 determines whether the candidate item can be from another page of the same site and related to a user activity performed by another user socially connected to the first user in a social graph. For example, the producer module 214 determines whether the candidate item from another page of the same site has an endorsement, a share or a comment generated by a friend. If the candidate item can be from another page of the same site and related to a user activity performed by another user connected to the first user in a social graph, the producer module 214 presents 616 an invitation state displaying one or more of the candidate item, the user activity and a name of the other user. Otherwise, the method 600 moves to block 617.

Figure 6B:
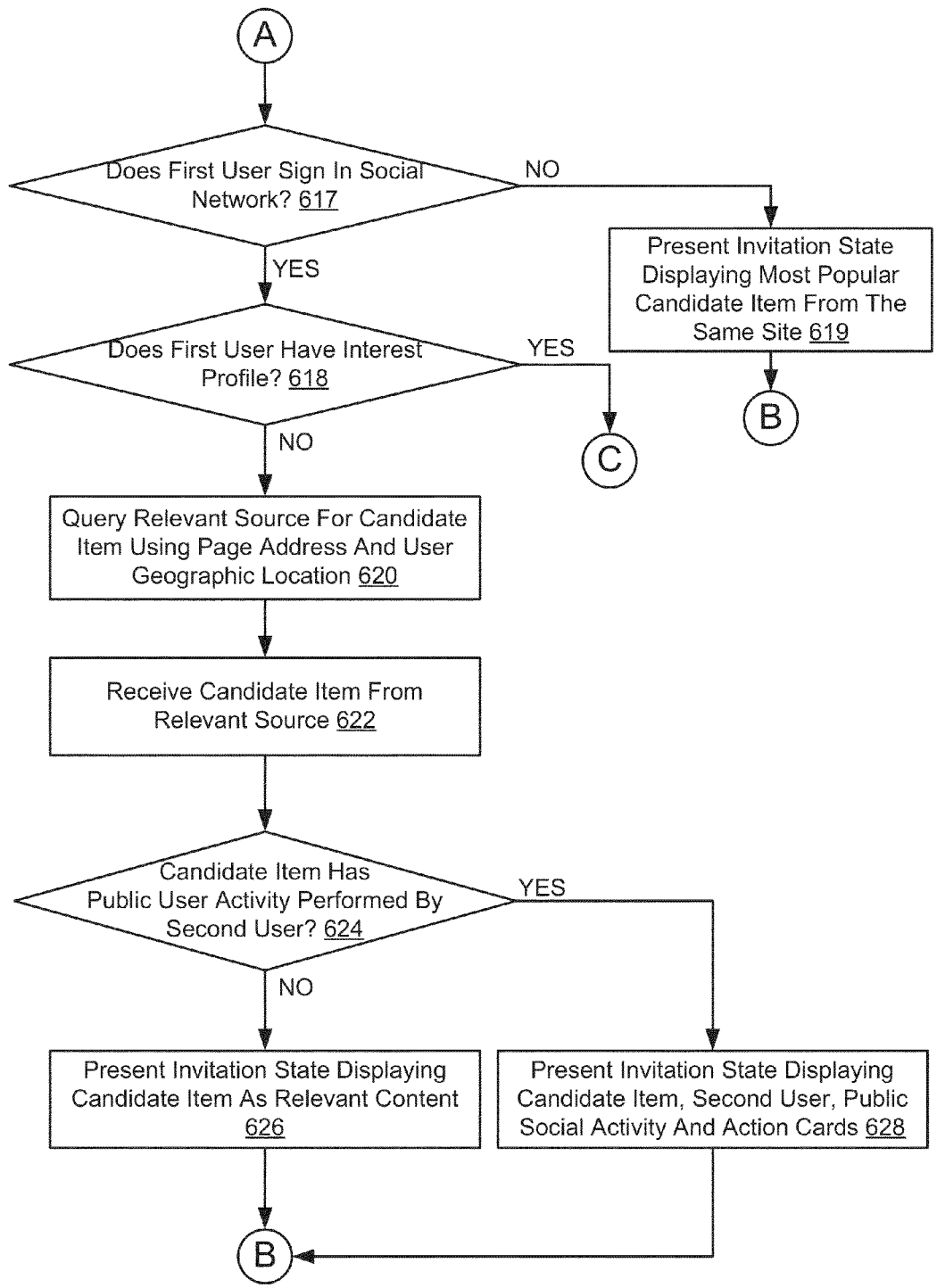

Referring to FIG. 6B, the method 600 determines 617 whether the first user has signed in a social network. If the first user has not signed in the social network, the producer module 214 presents 619 an invitation state displaying one or more most popular candidate items (e.g., top 10 best articles) from the same site to the first user. Otherwise, the method 600 moves to block 618. At block 618, the method 600 determines whether the first user has an interest profile. If the first user has an interest profile, the method 600 moves to block 630. Otherwise, the method 600 moves to block 620. At block 620, the candidate retrieval module 206 queries 620 a relevant source for candidate items using an address of the page and a geographic location of the first user upon the consent of the first user. The candidate retrieval module 204 receives 622, via the controller 202, a candidate item from the relevant source.

The producer module 214 determines 624 whether the candidate item has public user activity performed by a second user. The second user can be, for example, a specialist or a celebrity who explicitly consents to share his or her activity related to the candidate item publicly. If the candidate item has public user activity performed by the second user, the producer module 214 presents 628 an invitation state displaying the candidate item, a name for the second user, the public social activity and one or more action cards to the first user. Otherwise, the producer module 214 presents 626 an invitation state displaying the candidate item as relevant content for the page visited by the first user. For example, the candidate item can be displayed as "people who visit this page also view this candidate item."

Figure 6C:
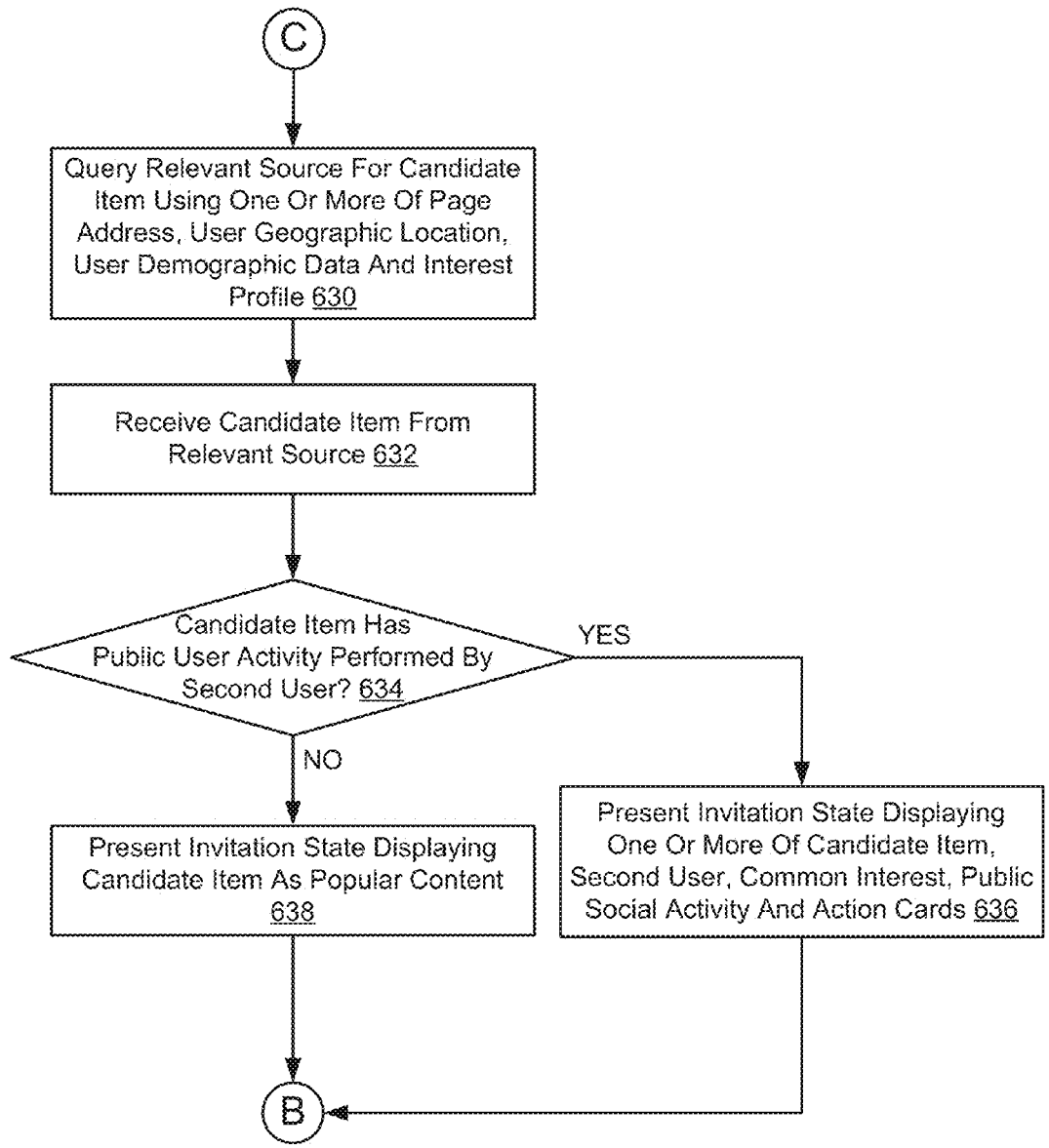

Referring to FIG. 6C, the candidate retrieval module 206 queries 630 a relevant source for candidate items using one or more of an address of the page, a geographic location of the first user, demographic data and an interest profile associated with the first user upon the consent of the first user. The candidate retrieval module 206 receives 632, via the controller 202, a candidate item from the relevant source. The producer module 214 determines 634 whether the candidate item has public user activity performed by a second user. The second user can be, for example, a specialist or a celebrity who explicitly consents to share his or her activity related to the candidate item publicly. If the candidate item has public user activity performed by the second user, the producer module 214 presents 636 an invitation state displaying the candidate item, a name for the second user, the public social activity and one or more action cards to the first user. Otherwise, the producer module 214 presents 638 an invitation state displaying the candidate item as popular content. For example, the candidate item can be displayed as "popular with people who visit this page."

Figure 6D:
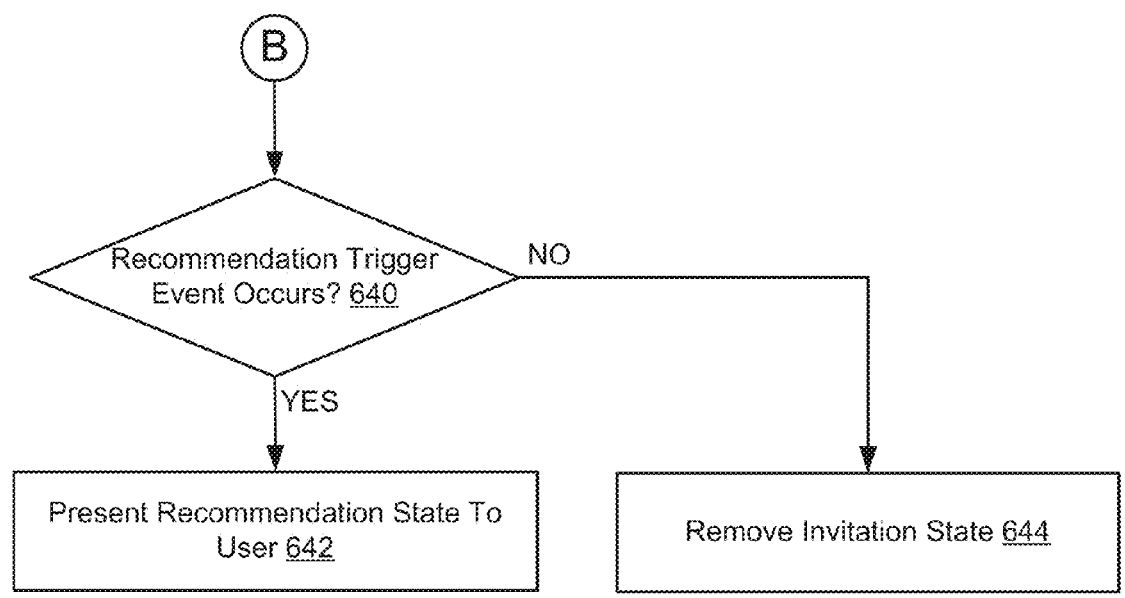

Referring to FIG. 6D, the trigger module 212 determines 640 whether a recommendation trigger event occurs. If a recommendation trigger event occurs, the producer module 214 presents 642 a recommendation state to the first user. Otherwise, the producer module 214 removes 644 the invitation state.

Figure 7A:
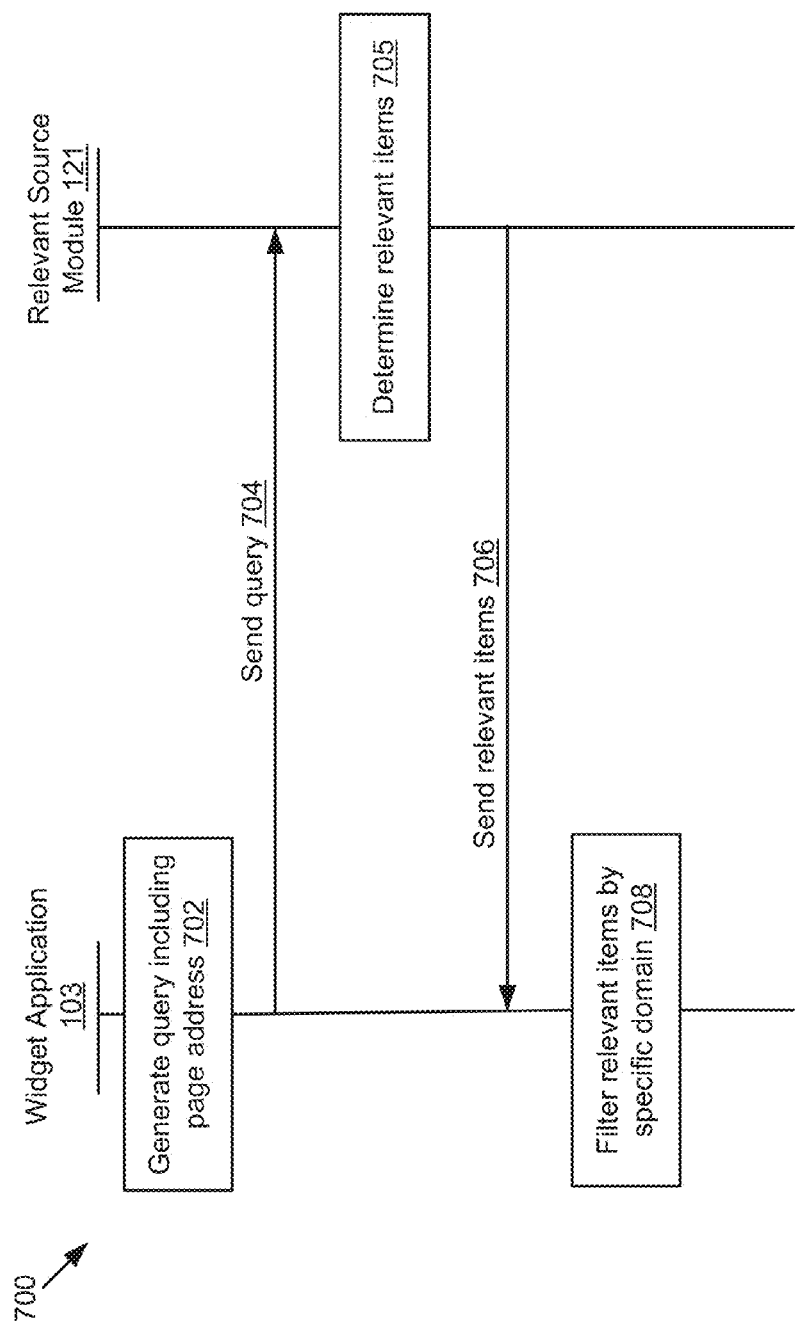
FIGS. 7A and 7B are event diagrams of various example processes for querying a relevant source to obtain candidate items.
Figure 7B:
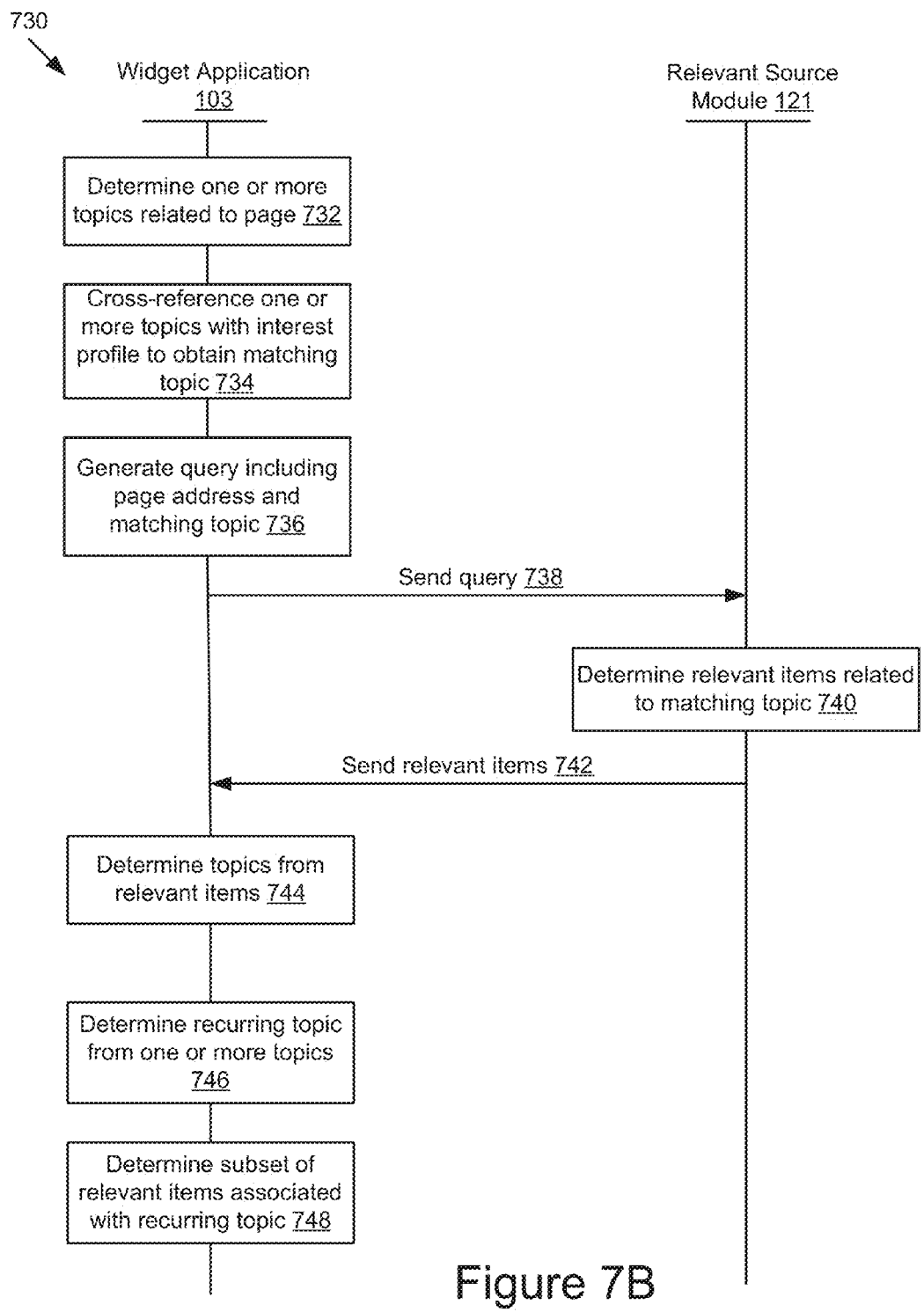

FIGS. 7A and 7B are event diagrams of various example processes 700, 730 for querying a relevant source to obtain candidate items. Referring to FIG. 7A, in some implementations the candidate retrieval module 206 generates 702 a query that includes an address of a page currently visited by a user. The controller 202 sends 704 the query to the relevant source module 121. The relevant source module 121 determines 705 relevant items from the relevant source and sends 706 the relevant items to the candidate retrieval module 206. The candidate retrieval module 206 filters 708 the relevant items by a specific domain (e.g., a domain of the page).

Referring to FIG. 7B, in some implementations the candidate retrieval module 206 determines 732 one or more topics related to a page currently visited by a user. The candidate retrieval module 206 cross-references 734 the one or more topics with an interest profile associated with the user to obtain a matching topic. The candidate retrieval module 206 generates 736 a query that includes an address of the page and the matching topic. The controller 202 sends 738 the query to the relevant source module 121. The relevant source module 121 determines 740 relevant items related to the matching topic from the relevant source. The relevant source module 121 sends 742 the relevant items to the candidate retrieval module 121. The candidate retrieval module 206 determines 744 one or more topics from the relevant items. The candidate retrieval module 206 determines 746 a recurring topic from the one or more topics. The candidate retrieval module 206 determines 748 a subset of relevant items associated with the recurring topic.

Figure 8:
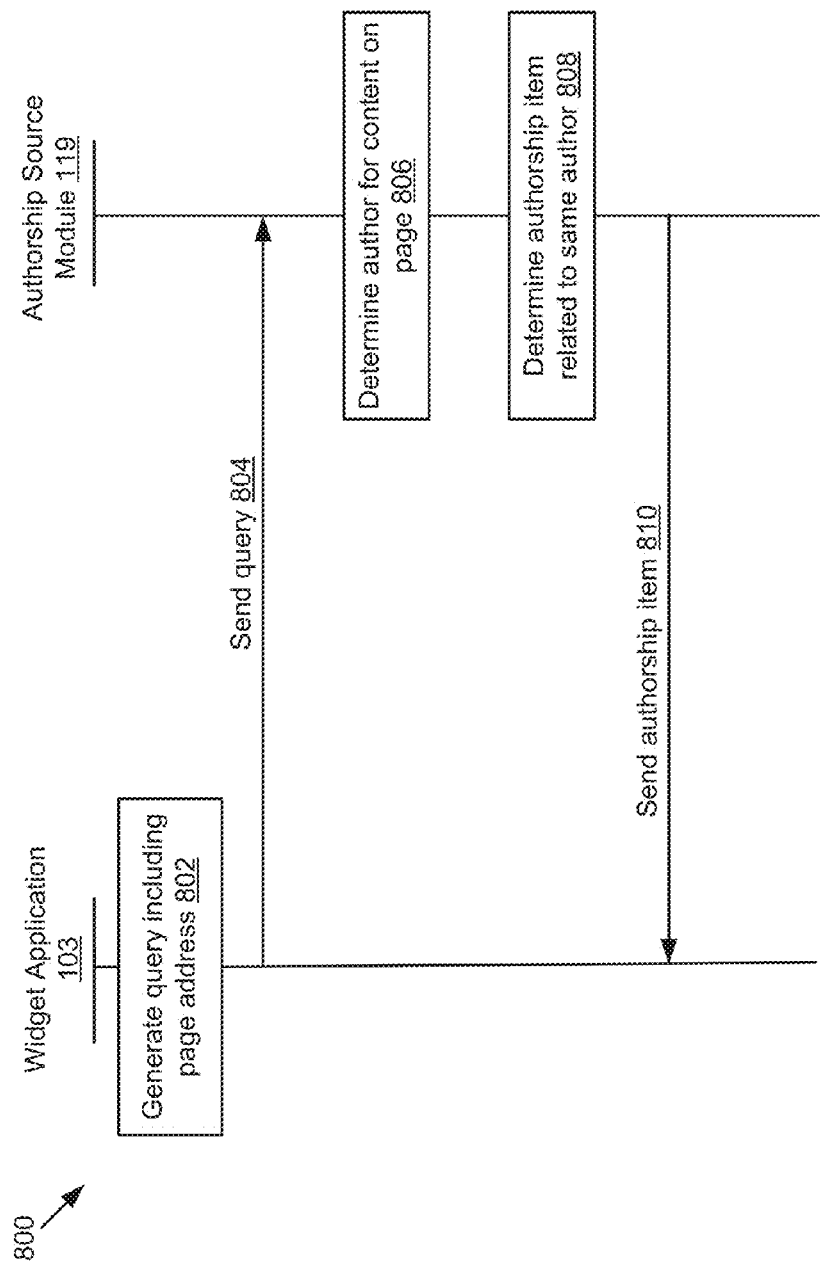
FIG. 8 is an event diagram of an example process for querying an authorship source to obtain candidate items.

FIG. 8 is an event diagram of an example process 800 for querying an authorship source to obtain candidate items. In some implementations, the candidate retrieval module 206 generates 802 a query including an address of a page currently visited by a user. The controller 202 sends 804 the query to the authorship source module 119. The authorship source module 119 determines 806 an author for content on the page. The authorship source module 119 determines 808 an authorship item related to the same author of the content on the page. The authorship source module 119 sends 810 the authorship item to the candidate retrieval module 206.

Figure 9A:
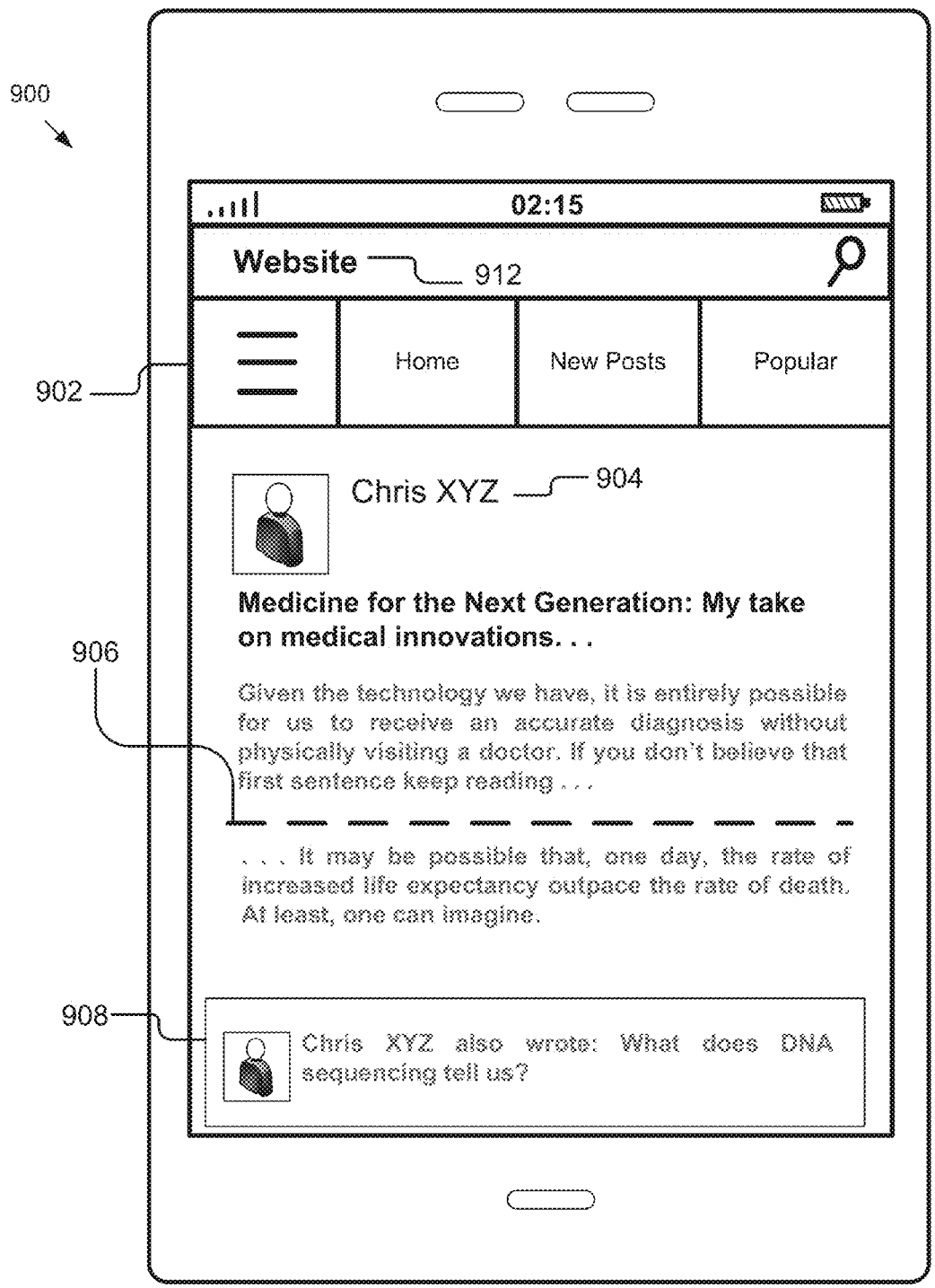
FIGS. 9A and 9B are graphic representations of example user interfaces for providing content recommendation to users from an authorship source.
Figure 9B:
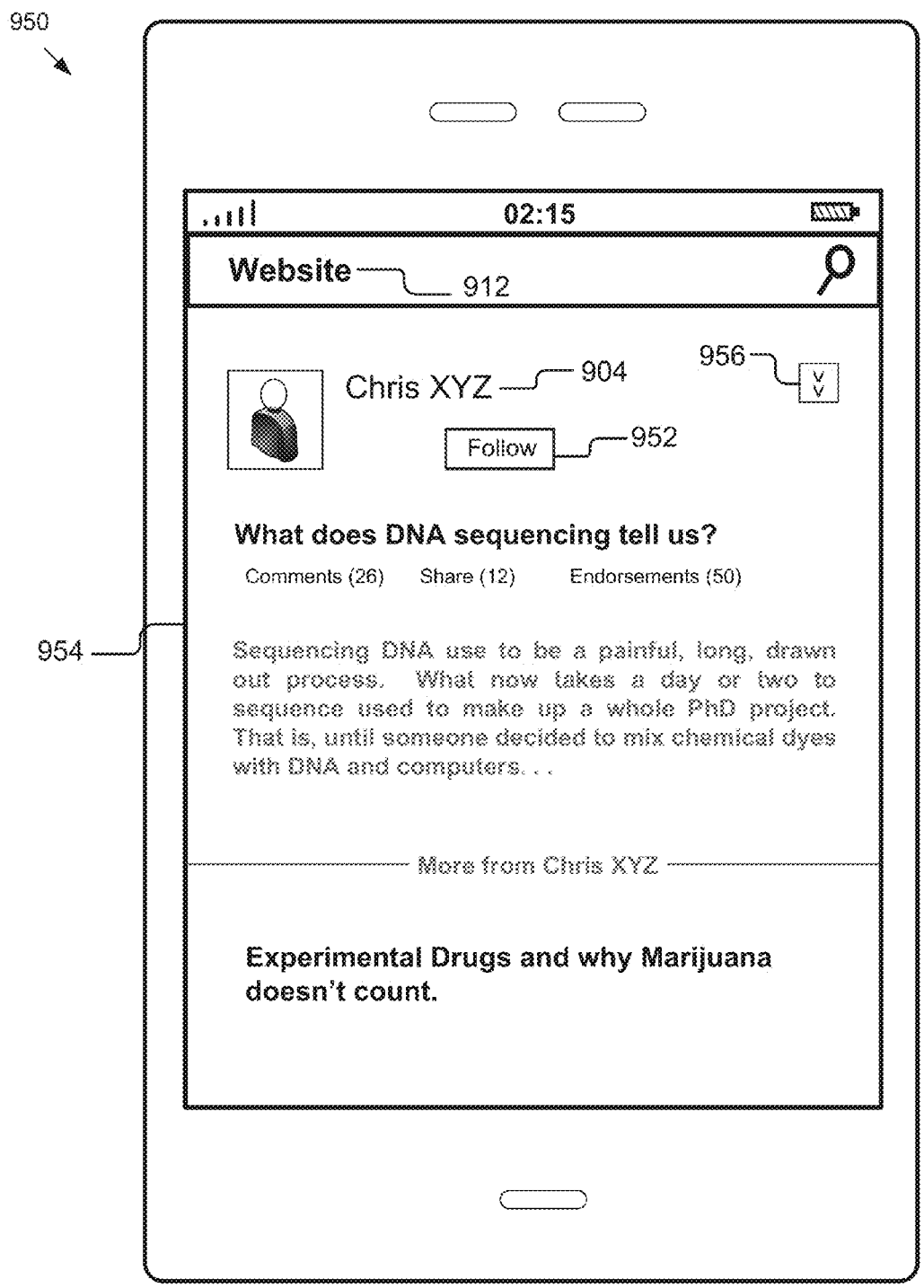

FIGS. 9A and 9B are graphic representations 900, 950 of example user interfaces 902, 954 for providing content recommendation to users from an authorship source. Referring to FIG. 9A, the example user interface 902 indicates a user reads an article written by an author 904 "Chris XYZ" on a page from a website 912. When the user scrolls to a location 906, an invitation trigger event occurs. An invitation state 908 can be presented to the user which includes another article written by the same author 904 from the same website 912. If the user scrolls passing the location 906 without clicking on the invitation state 908, the invitation state 908 recedes out of the user interface 902.

If the user clicks on the invitation state 908, a recommendation trigger event occurs and the other article will be presented in a recommendation state to the user as illustrated in FIG. 9B. Referring to FIG. 9B, the example user interface 954 indicates the user reads the other article written by the same author 904 "Chris XYZ" on another page from the same website 912. The user can follow the author 904 by clicking on the "follow" button 952. The user can return to the previously visited page by clicking on a button 956.

Figure 10A:
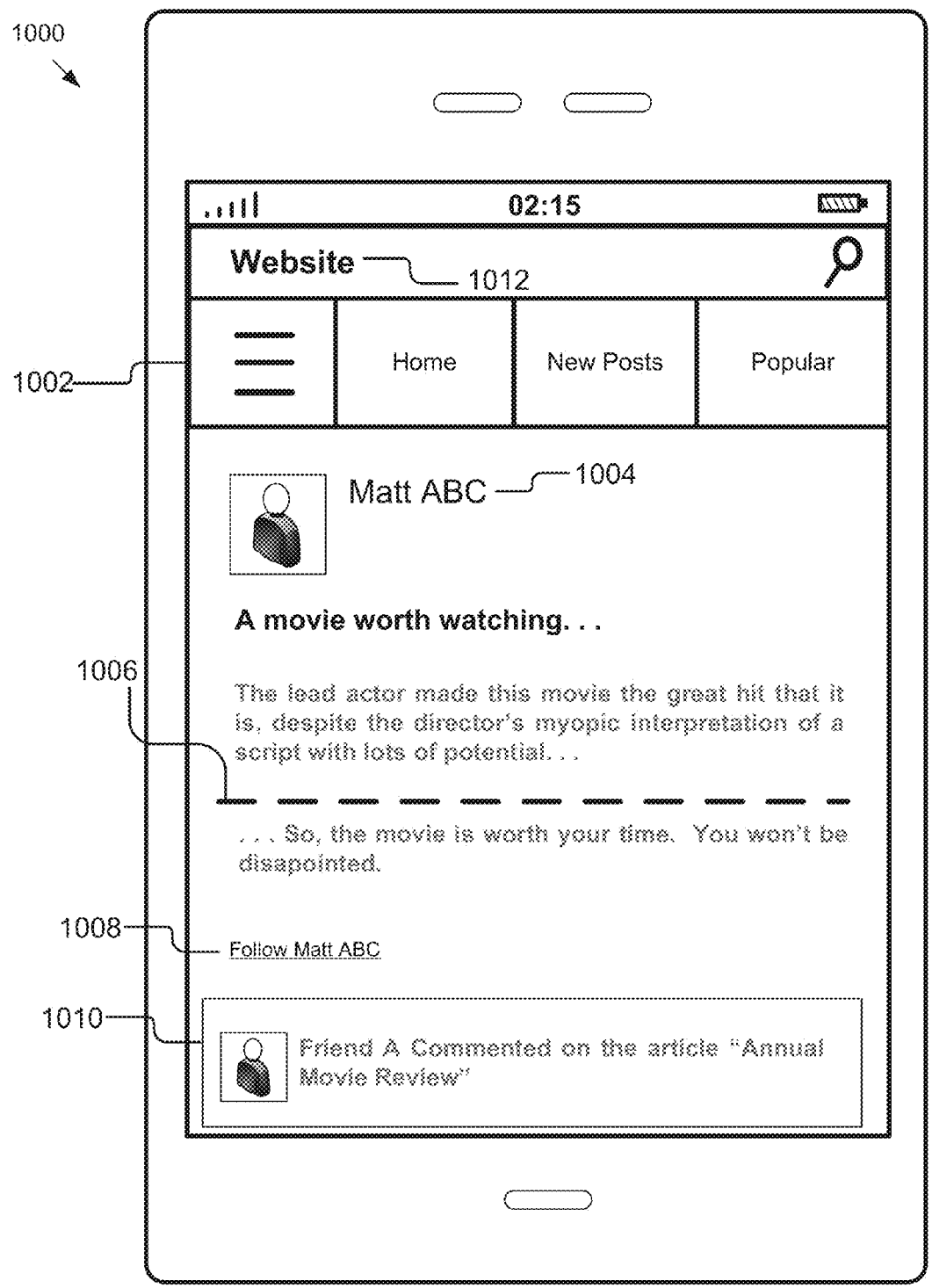
FIGS. 10A-10C are graphic representations of example user interfaces for providing content recommendation to users from a social source.
Figure 10B:
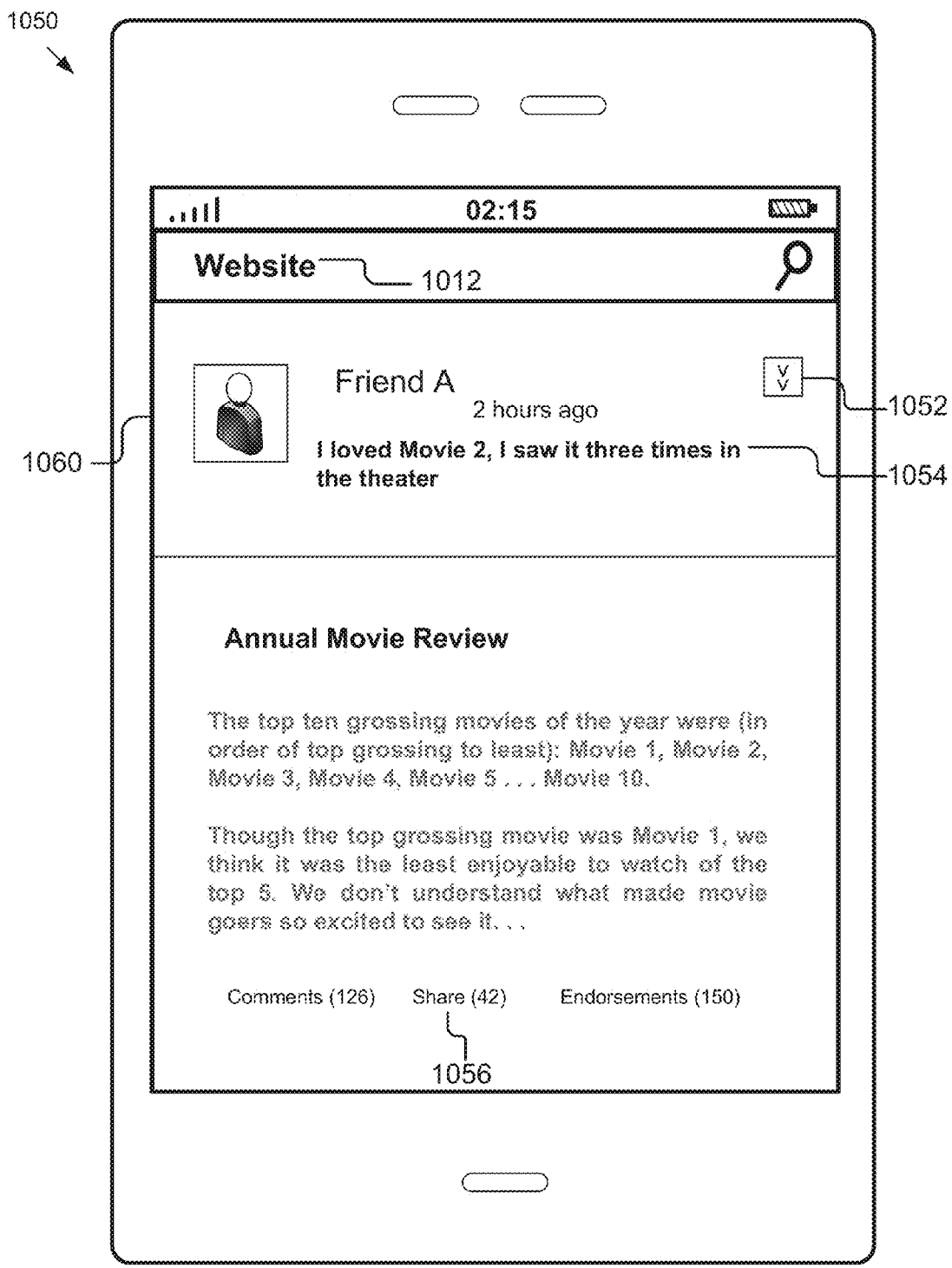
Figure 10C:
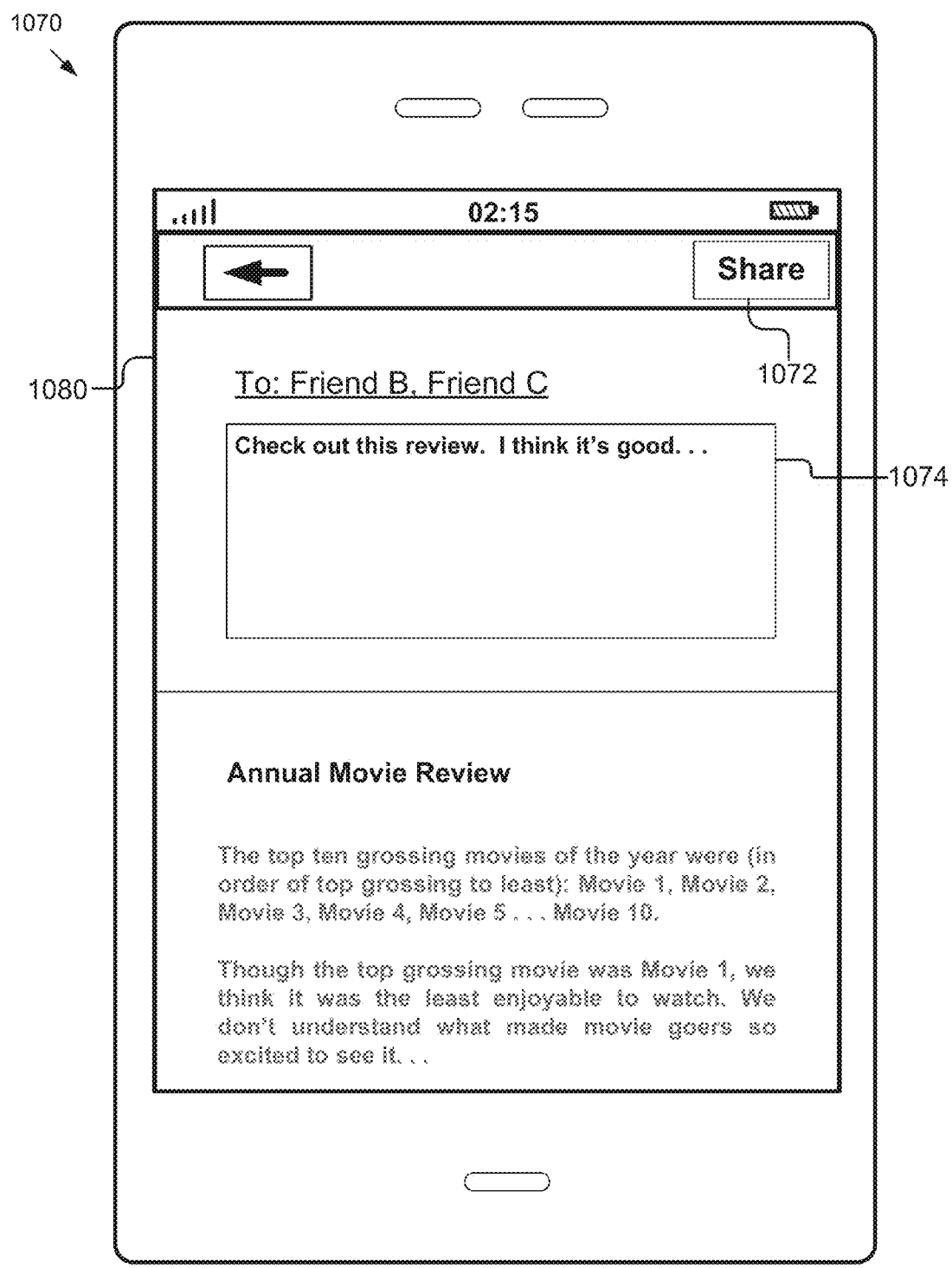

FIGS. 10A-10C are graphic representations 1000, 1050, 1070 of example user interfaces 1002, 1060, 1080 for providing content recommendation to users from a social source. Referring to FIG. 10A, the example user interface 1002 indicates a user reads an article written by an author 1004 "Matt ABC" on a page from a website 1012. When the user scrolls to a location 1006, an invitation trigger event occurs. An invitation state 1010 can be presented to the user which includes a message describing that Friend A of the user has commented on another article from the same website 1012. If the user scrolls passing the location 1006 without clicking on the invitation state 1010, the invitation state 1010 recedes out of the user interface 1002. The user can follow the author 1004 by clicking on a following message 1008.

If the user clicks on the invitation state 1010, a recommendation trigger event occurs and the comment from Friend A will be presented in a recommendation state to the user as illustrated in FIG. 10B. Referring to FIG. 10B, the example user interface 1060 includes a comment 1054 from Friend A related to another article from the same website 1012 and content of the other article. The user can return to the previously visited page by clicking on a button 1052. The user can also share the other article by clicking on a share button 1056, causing the user interface 1080 to be displayed to the user. Referring to FIG. 10C, the user interface 1080 allows the user to share the other article with other friends. The user can input a comment in a box 1074 and share the article and the comment with other friends by clicking on a share button 1072.

Figure 11A:
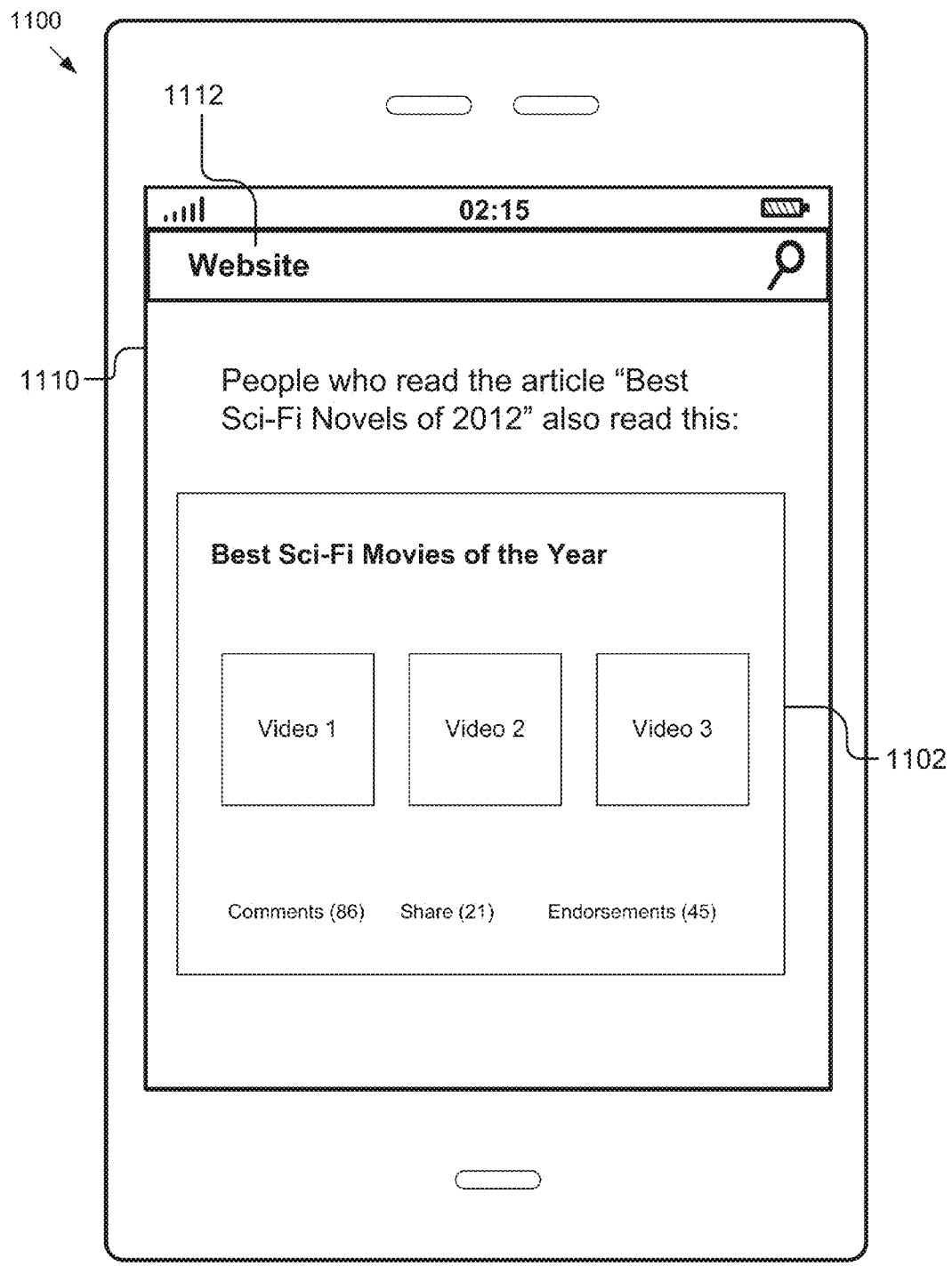
FIGS. 11A and 11B are graphic representations of example user interfaces for providing content recommendation to users from a relevant source.
Figure 11B:
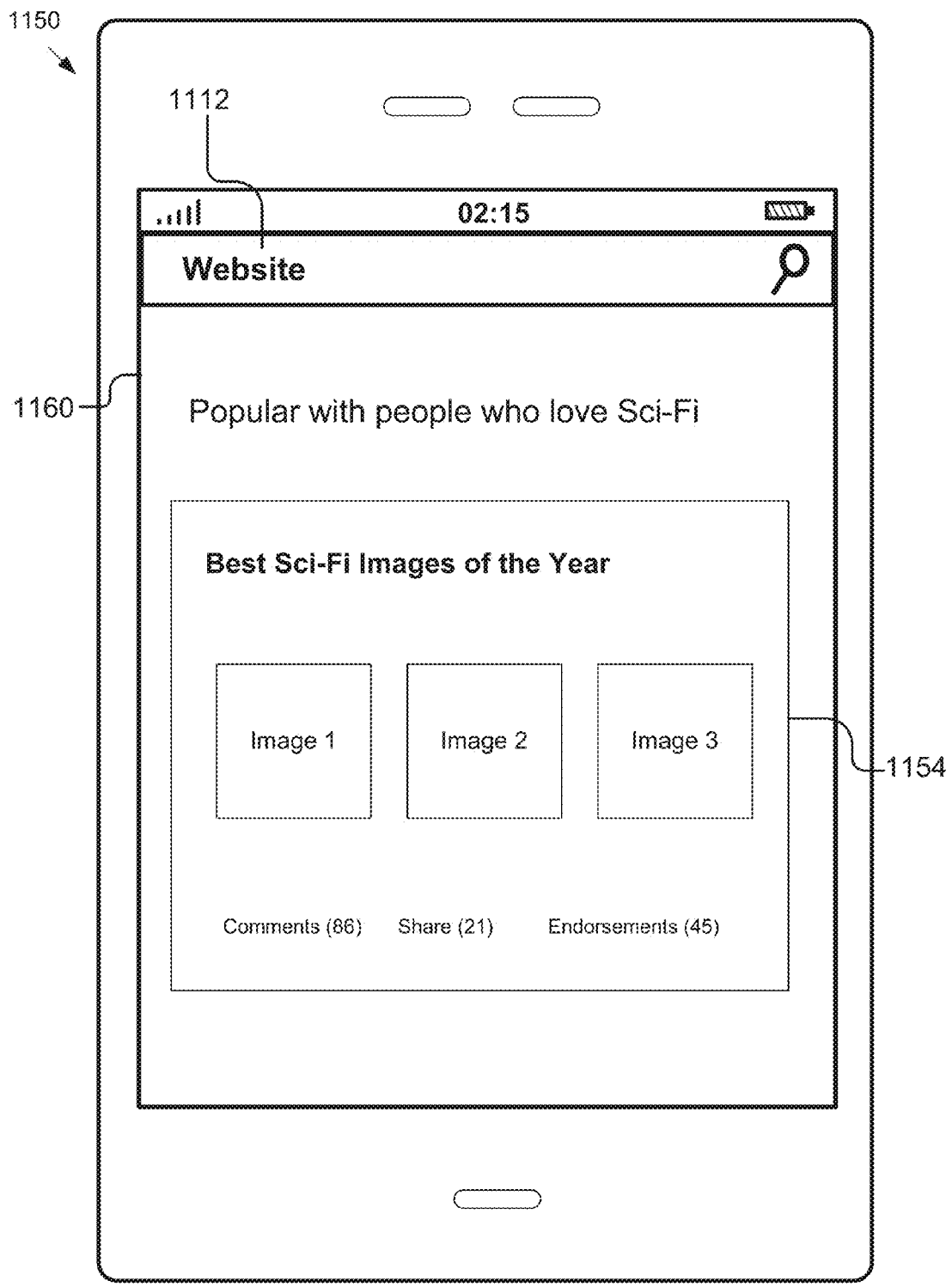

FIGS. 11A and 11B are graphic representations 1100, 1150 of example user interfaces 1110, 1160 for providing content recommendation to users from a relevant source. Referring to FIG. 11A, a user reads an article "Best Sci-Fi Novels of 2012" on a page from a website 1112. The example user interface 1110 includes a relevant item 1102 from the same website 1112 represented as "people who read the article 'Best Sci-Fi Novels of 2012' also read this." Referring to FIG. 11B, the example user interface 1160 includes a relevant item 1154 from the same website 1112 represented as "popular with people who love Sci-Fi."

In the above description, for purposes of explanation, numerous specific details are set forth in order to provide a thorough understanding of the specification. It will be apparent, however, to one skilled in the art that the invention can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving data describing a page on a site visited by a first user;
   querying, with one or more processors, one or more sources to retrieve one or more candidate items from the site for the first user;
   determining, with the one or more processors, one or more source types related to the one or more candidate items;
   determining, with the one or more processors, one or more scores for the one or more candidate items based on an interest profile associated with the first user and the one or more source types;
   ranking, with the one or more processors, the one or more candidate items;
   determining, with the one or more processors, that an invitation trigger event causing a presentation of an invitation state occurs;
   providing, with the one or more processors, the invitation state to the first user;
   determining, with the one or more processors, that a recommendation trigger event causing a presentation of a recommendation state occurs during the presentation of the invitation state; and
   providing, with the one or more processors, the recommendation state to the first user, the recommendation state including one or more of the ranked candidate items.

2. The method of claim 1, wherein the one or more sources include one or more of a social source, an authorship source, a relevant source and a popular source.

3. The method of claim 1, wherein querying the one or more sources to retrieve the one or more candidate items comprises:
   querying a social source to retrieve a social item that has a user activity performed by a second user who is connected to the first user in a social graph, the social item from the same site as the page and being included in the one or more candidate items.

4. The method of claim 1, wherein content in the page is provided by an author and querying the one or more sources to retrieve the one or more candidate items comprises:
   querying an authorship source to retrieve an authorship item that is provided by the same author, the authorship item from the same site as the page and being included in the one or more candidate items.

5. The method of claim 1, wherein querying the one or more sources to retrieve the one or more candidate items comprises:

querying a relevant source to retrieve a relevant item, the relevant item from the same site as the page and being included in the one or more candidate items.

6. The method of claim 5, wherein querying the relevant source to retrieve the relevant item comprises:
   determining one or more topics related to the page;
   cross-referencing the one or more topics with the interest profile of the first user to obtain a matching topic;
   generating a query that includes an address of the page and the matching topic;
   sending the query to the relevant source;
   receiving a set of relevant items related to the matching topic from the relevant source;
   determining a recurring topic from the set of relevant items; and
   determining the relevant item as one related to the recurring topic from the set of relevant items.

7. The method of claim 1, wherein the recommendation state includes one or more action cards for performing one or more engagement actions associated with the one or more of the ranked candidate items.

8. A computer program product comprising a computer usable medium including a computer readable program, wherein the computer readable program when executed on a computer causes the computer to:
   receive data describing a page on a site visited by a first user;
   query one or more sources to retrieve one or more candidate items from the site for the first user;
   determine one or more source types related to the one or more candidate items;
   determine one or more scores for the one or more candidate items based on an interest profile associated with the first user and the one or more source types;
   rank the one or more candidate items;
   determine that an invitation trigger event causing a presentation of an invitation state occurs;
   provide the invitation state to the first user;
   determine that a recommendation trigger event causing a presentation of a recommendation state occurs during the presentation of the invitation state; and
   provide the recommendation state to the first user, the recommendation state including one or more of the ranked candidate items.

9. The computer program product of claim 8, wherein the one or more sources include one or more of a social source, an authorship source, a relevant source and a popular source.

10. The computer program product of claim 8, wherein querying the one or more sources to retrieve the one or more candidate items comprises:
    querying a social source to retrieve a social item that has a user activity performed by a second user who is connected to the first user in a social graph, the social item from the same site as the page and being included in the one or more candidate items.

11. The computer program product of claim 8, wherein content in the page is provided by an author and querying the one or more sources to retrieve the one or more candidate items comprises:
    querying an authorship source to retrieve an authorship item that is provided by the same author, the authorship item from the same site as the page and being included in the one or more candidate items.

12. The computer program product of claim 8, wherein querying the one or more sources to retrieve the one or more candidate items comprises:
    querying a relevant source to retrieve a relevant item, the relevant item from the same site as the page and being included in the one or more candidate items.

13. The computer program product of claim 12, wherein querying the relevant source to retrieve the relevant item comprises:
    determining one or more topics related to the page;
    cross-referencing the one or more topics with the interest profile of the first user to obtain a matching topic;
    generating a query that includes an address of the page and the matching topic;
    sending the query to the relevant source;
    receiving a set of relevant items related to the matching topic from the relevant source;
    determining a recurring topic from the set of relevant items; and
    determining the relevant item as one related to the recurring topic from the set of relevant items.

14. The computer program product of claim 8, wherein the recommendation state includes one or more action cards for performing one or more engagement actions associated with the one or more of the ranked candidate items.

15. A system comprising:
    a processor; and
    a memory storing instructions that, when executed, cause the system to:
      receive data describing a page on a site visited by a first user;
      query one or more sources to retrieve one or more candidate items from the site for the first user;
      determine one or more source types related to the one or more candidate items;
      determine one or more scores for the one or more candidate items based on an interest profile associated with the first user and the one or more source types;
      rank the one or more candidate items;
      determine that an invitation trigger event causing a presentation of a invitation state occurs;
      provide the invitation state to the first user;
      determine that a recommendation trigger event causing a presentation of a recommendation state occurs during the presentation of the invitation state; and
      provide the recommendation state to the first user, the recommendation state including one or more of the ranked candidate items.

16. The system of claim 15, wherein the one or more sources include one or more of a social source, an authorship source, a relevant source and a popular source.

17. The system of claim 15, wherein the instructions when executed cause the system to query the one or more sources to retrieve the one or more candidate items by:
    querying a social source to retrieve a social item that has a user activity performed by a second user who is connected to the first user in a social graph, the social item from the same site as the page and being included in the one or more candidate items.

18. The system of claim 15, wherein content in the page is provided by an author and the instructions when executed cause the system to query the one or more sources to retrieve the one or more candidate items by:
    querying an authorship source to retrieve an authorship item that is provided by the same author, the authorship item from the same site as the page and being included in the one or more candidate items.

19. The system of claim 15, wherein the instructions when executed cause the system to query the one or more sources to retrieve the one or more candidate items by:

querying a relevant source to retrieve a relevant item, the relevant item from the same site as the page and being included in the one or more candidate items.

20. The system of claim 19, wherein the instructions when executed cause the system to query the relevant source to retrieve the relevant item by:
determining one or more topics related to the page;
cross-referencing the one or more topics with the interest profile of the first user to obtain a matching topic;
generating a query that includes an address of the page and the matching topic;
sending the query to the relevant source;
receiving a set of relevant items related to the matching topic from the relevant source;
determining a recurring topic from the set of relevant items; and
determining the relevant item as one related to the recurring topic from the set of relevant items.

* * * * *